US011794208B2

(12) United States Patent
Furuki et al.

(10) Patent No.: US 11,794,208 B2
(45) Date of Patent: Oct. 24, 2023

(54) FLUIDIZED-BED COATING METHOD AND FLUIDIZED-BED COATING APPARATUS

(71) Applicant: FUJIFILM Business Innovation Corp., Tokyo (JP)

(72) Inventors: Makoto Furuki, Kanagawa (JP);
Susumu Yoshino, Kanagawa (JP);
Hiroshi Saegusa, Kanagawa (JP);
Satoshi Yoshida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 156 days.

(21) Appl. No.: 16/932,855

(22) Filed: Jul. 20, 2020

(65) Prior Publication Data
US 2021/0299699 A1      Sep. 30, 2021

(30) Foreign Application Priority Data
Mar. 27, 2020   (JP) .................. 2020-058594

(51) Int. Cl.
*B05D 1/24*  (2006.01)
*B05D 1/20*  (2006.01)
(Continued)

(52) U.S. Cl.
CPC ............... *B05D 1/24* (2013.01); *B05C 3/04* (2013.01); *B05C 3/09* (2013.01); *B05C 11/045* (2013.01);
(Continued)

(58) Field of Classification Search
CPC .......... B05D 1/20; B05D 1/24; B05D 3/0218; B05D 3/0254; B05C 19/02; B05C 3/09;
(Continued)

(56) References Cited

U.S. PATENT DOCUMENTS 3,063,860 A * 11/1962 Gemmer .................. B05D 7/22
427/195
3,090,696 A *  5/1963 Gemmer .................. B05D 1/24
427/195
(Continued)

FOREIGN PATENT DOCUMENTS

DE           201911    *  8/1983
JP        2001234112      8/2001

OTHER PUBLICATIONS

Freeman. "Measuring the flow properties of consolidated, conditioned and aerated powders—A comparative study using a powder rheometer and a rotational shear cell". Powder Technology 174 (2007) 25-33. (Year: 2007).*

*Primary Examiner* — Alexander M Weddle
(74) *Attorney, Agent, or Firm* — JCIPRNET

(57) ABSTRACT

A fluidized-bed coating method includes: immersing at least part of a workpiece in a powder coating material contained in a fluidized-bed vessel while air is introduced from a bottom of the fluidized-bed vessel at an average air flow rate of 5 mm/min or higher and 20 mm/min or lower per unit area of the bottom so that a floating ratio of the powder coating material is 5% or higher and 20% or lower, the workpiece having a temperature higher than or equal to a softening temperature of the powder coating material and lower than or equal to a melting temperature of the powder coating material; taking the workpiece out of the powder coating material; and heating the powder coating material attached to the workpiece.

9 Claims, 4 Drawing Sheets

(51) Int. Cl.
*B05D 3/02* (2006.01)
*B05C 3/09* (2006.01)
*B05C 3/04* (2006.01)
*C09D 5/03* (2006.01)
*B05C 19/02* (2006.01)
*C08K 3/36* (2006.01)
*C09D 125/06* (2006.01)
*C09D 133/12* (2006.01)
*B05C 11/04* (2006.01)

(52) U.S. Cl.
CPC ............... *B05C 19/02* (2013.01); *B05D 1/20* (2013.01); *B05D 3/0218* (2013.01); *B05D 3/0254* (2013.01); *C08K 3/36* (2013.01); *C09D 5/031* (2013.01); *C09D 5/033* (2013.01); *C09D 125/06* (2013.01); *C09D 133/12* (2013.01)

(58) Field of Classification Search
CPC ....... B05C 3/04; B05C 11/045; C09D 125/06; C09D 5/033; C09D 133/12; C09D 5/031; C08K 3/36
See application file for complete search history.

(56) References Cited

U.S. PATENT DOCUMENTS

| | | | | |
|---|---|---|---|---|
| 3,148,077 | A * | 9/1964 | Garetto | B05D 7/18 427/195 |
| 3,432,326 | A * | 3/1969 | Lemelson | B05D 1/24 427/195 |
| 3,814,616 | A * | 6/1974 | Kondo et al. | B05B 5/12 427/195 |
| 3,864,149 | A * | 2/1975 | Scheiber | B05D 3/0254 427/346 |
| 4,025,664 | A * | 5/1977 | Gerek | B05B 13/0609 427/195 |
| 4,039,697 | A * | 8/1977 | Isawa | C23C 24/08 204/507 |
| 5,175,942 | A * | 1/1993 | Dutta | B01J 8/003 118/DIG. 5 |
| 2016/0074900 | A1* | 3/2016 | Okamoto | B05D 1/26 118/620 |
| 2016/0280953 | A1* | 9/2016 | Maehata | C09D 133/066 |

* cited by examiner

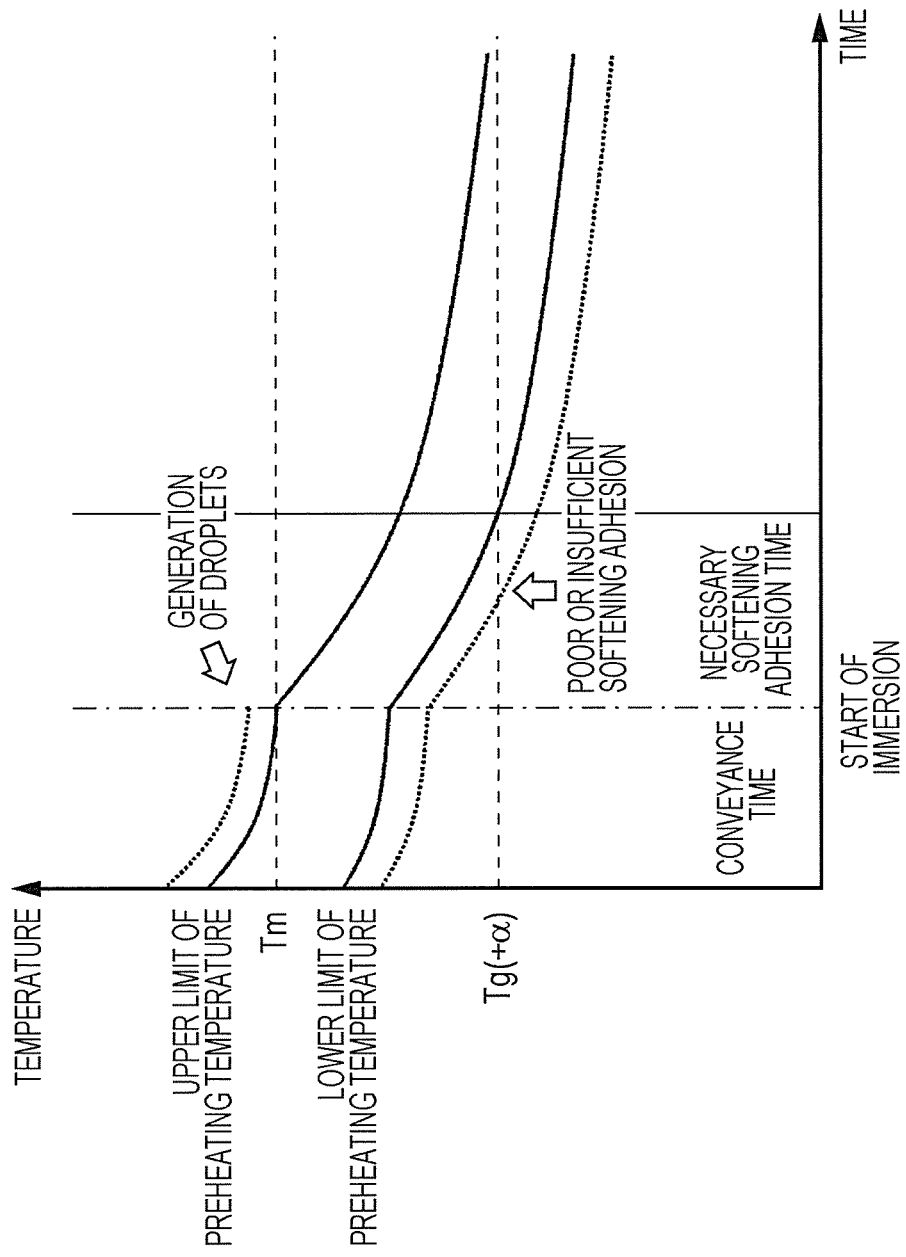

FLUIDIZED-BED COATING METHOD AND FLUIDIZED-BED COATING APPARATUS

CROSS-REFERENCE TO RELATED APPLICATIONS

This application is based on and claims priority under 35 USC 119 from Japanese Patent Application No. 2020-058594 filed Mar. 27, 2020.

BACKGROUND

(i) Technical Field

The present disclosure relates to a fluidized-bed coating method and a fluidized-bed coating apparatus.

(ii) Related Art

Fluidized-bed coating is known as a method for forming a coating film. This method involves supplying air from the bottom of a fluidized-bed vessel containing a powder coating material, immersing a workpiece in the powder coating material in the fluidized state, taking the workpiece out of the powder coating material, and then heating a film of the powder coating material attached to the workpiece to form a coating film.

For example, Japanese Unexamined Patent Application Publication No. 2001-234112 discloses a powder coating material for fluidized-bed coating. The powder coating material contains a polyolefin resin powder, an inorganic powder, and a metal soap powder and has a median particle diameter of 90 to 160 μm, a bulk specific gravity of 0.35 to 0.50 g/ml, and an angle of repose of 20 to 35 degrees.

SUMMARY

However, it is difficult to form a thin coating film by fluidized-bed coating.

Aspects of non-limiting embodiments of the present disclosure relate to a fluidized-bed coating method that realizes continuous thin film coating compared with a method in which the average air flow rate of air introduced from the bottom of a fluidized-bed vessel is lower than 5 mm/min or higher than 20 mm/min, a method in which the floating ratio of the powder coating material is lower than 5% or higher than 20%, and a method in which a workpiece has a temperature lower than the softening temperature of the powder coating material or higher than the melting temperature of the powder coating material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a fluidized-bed coating method including: immersing at least part of a workpiece in a powder coating material contained in a fluidized-bed vessel while air is introduced from a bottom of the fluidized-bed vessel at an average air flow rate of 5 mm/min or higher and 20 mm/min or lower per unit area of the bottom so that a floating ratio of the powder coating material is 5% or higher and 20% or lower, the workpiece having a temperature higher than or equal to a softening temperature of the powder coating material and lower than or equal to a melting temperature of the powder coating material; taking the workpiece out of the powder coating material; and heating the powder coating material attached to the workpiece.

BRIEF DESCRIPTION OF THE DRAWINGS

Exemplary embodiments of the present disclosure will be described in detail based on the following figures, wherein:

FIG. 4 is a diagram for describing the conditions of the preheating temperature for a workpiece on which a thin continuous coating film is to be formed.

DETAILED DESCRIPTION

Figure 1A:
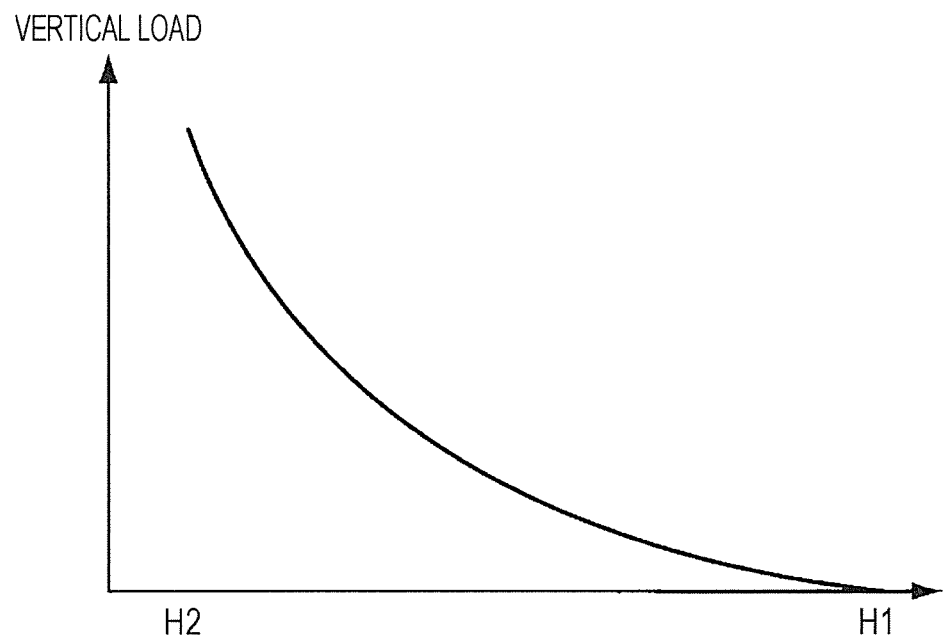
FIGS. 1A and 1B are figures for describing a method for measuring the amount of flowability energy with a powder rheometer.

Exemplary embodiments of the present disclosure will be described below.

The upper limit or lower limit of one numerical range in stepwise numerical ranges may be replaced by the upper limit or lower limit of another stepwise numerical range.

The upper limit or lower limit of one numerical range may be replaced by the value described in Examples.

Fluidized-Bed Coating Method

A fluidized-bed coating method according to an exemplary embodiment includes: immersing a workpiece in at least part of a powder coating material contained in a fluidized-bed vessel while air is introduced from a bottom of the fluidized-bed vessel at an average air flow rate of 5 mm/min or higher and 20 mm/min or lower per unit area of the bottom so that a floating ratio of the powder coating material is 5% or higher and 20% or lower, the workpiece having being preheated in the range of from the softening temperature of the powder coating material to a temperature 5° C. higher than the melting temperature of the powder coating material; taking the workpiece out of the powder coating material; and then heating a film of the powder coating material attached to the workpiece.

The fluidized-bed coating method according to the exemplary embodiment realizes continuous thin film coating. The reasons for this are assumed as described below.

First, for example, when the surface of a workpiece is coated with a resin powder coating material to ensure the electric insulation or corrosion prevention of the workpiece, a uniform coating film having a film thickness of 20 μm or more and 30 μm or less can be formed by a single coating operation in spray coating using a solvent-based coating material.

In spray coating, however, a workpiece is fixed to a pallet or the like, and a solvent-based coating material is applied to the workpiece from a distance of 200 mm or more and 300 mm or less so that the solvent-based coating material spreads out in large space. Thus, the coating efficiency of spray coating on a workpiece having a small size is as low as 10% or less. Accordingly, the coating of the entire surface of the workpiece uses a process for coating the workpiece at least two times for the front and back sides. In addition, the workpiece is refixed to the pallet in two coating operations for the front and back sides of the workpiece, and it is thus a burdensome task to fix the workpiece to the pallet multiple times.

A fluidized-bed coating method using a powder coating material involves supplying air from the bottom of a fluidized-bed vessel containing a powder coating material, immersing a workpiece in the powder coating material in the fluidized state, taking the workpiece out of the powder coating material, and then heating a film of the powder coating material attached to the workpiece to form a coating film. Accordingly, the coating efficiency is substantially 100%. Furthermore, fluidized-bed coating with no physical contact can form a coating film on the entire surface of the workpiece by a single coating operation without fixing the workpiece to the pallet. In this respect, a fluidized-bed coating method uses a powder coating material. A solvent-based coating material may be used in coating by an immersion method, such as that using a powder coating material, but a solvent-containing coating material normally has excessively high flowability, which causes dripping or excessively thin coating on edges. For this, a solvent-based coating material is unsuitable for precise coating.

For conventional powder coating materials, the minimum film thickness of a continuous film serving as a coating film is as thick as 100 μm or more. In forming a thinner continuous film, surface unevenness appears at a visually observable level, or many discontinuous sections are visually observed. It is thus very difficult to perform coating with a thin film. In particular, for small workpieces to be assembled before use, variations in size due to the thickness of the coating film directly relate to variations in assembly accuracy. It is thus difficult to use fluidized-bed coating in applications requiring advanced features under present circumstances.

To obtain a thin continuous coating film, a layer of at least two or three particles needs to be adsorbed to the workpiece. A powder coating material used in a conventional fluidized-bed coating method has a large particle diameter and provides, when being adsorbed to form a two- or three-particle layer, a film thickness of at least 50 μm or more, normally 100 μm or more. Such a powder coating material having a large particle diameter has a large heat capacity, and thus the surface temperature of the workpiece needs to be higher than or equal to the melting temperature Tm of the powder coating material (resin thereof) in order to adsorb such a powder coating material to the workpiece. In adsorbing a powder coating material having a small particle diameter in order to form a thin coating film, particles of about 20 μm or smaller are needed to form a continuous thin film having a film thickness of, for example, about 50 μm. For such a powder coating material having a small particle diameter, the powder coating material has a small heat capacity, and thus readily melts to form molten droplets when it comes into contact with a workpiece having a temperature largely exceeding the melting temperature Tm of the powder coating material (resin thereof). This hinders formation of a continuous thin film.

As a result of intensive studies by the inventors, the temperature conditions of a workpiece are examined assuming that the factor responsible for inhibiting formation of a thin coating film is as described above. Although a workpiece is heated to a temperature exceeding the melting temperature Tm of a powder coating material (resin thereof) in order to perform coating with a molten powder coating material in the related art, the temperature of a workpiece is set to a temperature lower than the melting temperature Tm. To soften a two- or three-particle layer of a powder coating material within a suitable time, the powder coating material in and near a region to be coated needs to be continuously exposed to softening conditions at a softening temperature Tg or higher for at least 5 seconds or longer, although the softening conditions slightly differ depending on the physical properties of resin. To satisfy this, the temperature of the workpiece and the air flow for fluidization affecting a decrease in the temperature of the workpiece needs to be adjusted.

In the fluidized-bed coating method according to the exemplary embodiment, the powder coating material is brought into a fluidized state while the average air flow rate from the bottom of the fluidized-bed vessel is as low as 5 mm/min or higher and 20 mm/min or lower, and the floating ratio of the powder coating material is as low as 5% or higher and 20% or lower. Accordingly, the powder coating material is in a fluidized state while the powder coating material maintains high bulk density. When a workpiece having a temperature higher than or equal to the softening temperature of the powder coating material and lower than or equal to the melting temperature of the powder coating material is immersed in the powder coating material in a fluidized state and the powder coating material softens and adsorbs to the workpiece, a dense and continuous thin film of the powder coating material is formed. While the film of the powder coating material is maintained in that state, the workpiece is taken out of the powder coating material.

After the workpiece is taken out of the powder coating material, the film of the powder coating material is heated so that the powder coating material melts to form a continuous and thin coating film (e.g., a continuous coating film having a film thickness of 20 μm or more and 50 μm or less).

From the foregoing description, the fluidized-bed coating method according to the exemplary embodiment is assumed to realize continuous thin film coating.

The details of the fluidized-bed coating method according to the exemplary embodiment will be described below.

In the fluidized-bed coating method according to the exemplary embodiment, a process for immersing the workpiece in the powder coating material and taking the workpiece out of the powder coating material may be a known process, such as a process in which the workpiece is immersed in and taken out of the powder coating material from above the powder coating material contained in a fluidized-bed vessel with the workpiece held, or a process in which the workpiece is dipped into the powder coating material contained in a fluidized-bed vessel and then taken out through vibration transportation.

Before or during the immersion of the workpiece in the powder coating material, the powder coating material may be vibrated.

During the immersion of the workpiece in the powder coating material, the workpiece may be in a stationary state, or may be moved along, for example, a straight line or arc at 10 to 20 mm/sec.

The workpiece may be partially immersed in the powder coating material or entirely immersed in the powder coating material. Whether the workpiece is immersed partially or entirely is selected depending on the region in which the coating film is to be formed.

The average air flow rate of air introduced from the bottom of the fluidized-bed vessel is 5 mm/min or higher and 20 mm/min or lower. To realize continuous thin film coating, the average air flow rate may be 5 mm/min or higher and 10 mm/min or lower.

If the average air flow rate is too low, the powder coating material does not have enough flowability, and the powder coating material discontinuously adheres to the workpiece, so that the coating film is not a continuous film. If the average air flow rate is too high, the powder coating material does not have enough bulk density (about 80% or more), and the softened adhesive film loses its denseness, which generates marked unevenness or defects to degrade the quality of the coating film after melting.

The average air flow rate is obtained by dividing the volume of air introduced per unit time (min) from the bottom of the fluidized-bed vessel by the area of the bottom (the surface from which air is introduced) of the fluidized-bed vessel.

The floating ratio of the powder coating material is 5% or higher and 20% or lower. To realize continuous thin film coating, the floating ratio may be 10% or higher and 15% or lower.

If the floating ratio is too low, the flowability of the powder coating material is not ensured, and the powder coating material discontinuously adheres to the workpiece, so that the coating film is not a continuous film. If the floating ratio is too high, the powder coating material does not have enough bulk density (about 80% or more), and the softened adhesive film loses its denseness. This generates marked unevenness or defects to degrade the quality of the coating film after melting.

The floating ratio is calculated from the formula H described below.

The temperature of the workpiece is from the softening temperature of the powder coating material to the melting temperature of the powder coating material. To realize continuous thin film coating, the temperature of the workpiece is preferably from a temperature 5° C. higher than the softening temperature of the powder coating material to the melting temperature of the powder coating material, from a temperature 10° C. higher than the softening temperature of the powder coating material to the melting temperature of the powder coating material, or from a temperature 20° C. higher than the softening temperature of the powder coating material to the melting temperature of the powder coating material.

When the temperature of the workpiece is in the above range, the powder coating material exhibits necessary softening adhesion, which realizes continuous thin film coating.

In particular, the surface temperature of the workpiece may be maintained in the range of from the softening temperature of the powder coating material to the melting temperature of the powder coating material for 5 seconds or longer immediately after immersion of the workpiece in the powder coating material.

The temperature of the workpiece is the surface temperature of the workpiece when the workpiece is immersed in the powder coating material.

To realize continuous thin film coating, the preheating temperature for the workpiece is preferably in the range of from a temperature 20° C. higher than the softening temperature of the powder coating material to a temperature 5° C. higher than the melting temperature of the powder coating material, more preferably in the range of from a temperature 25° C. higher than the softening temperature of the powder coating material to a temperature 5° C. higher than the melting temperature of the powder coating material, and still more preferably in the range of from a temperature 30° C. higher than the softening temperature of the powder coating material to the melting temperature of the powder coating material.

If the preheating temperature is too low and the workpiece is not reheated, as shown in FIG. 4, the temperature of the workpiece may decrease to too low a temperature before the elapse of necessary softening adhesion time for the powder coating material, which may cause insufficient coating. If the preheating temperature is too high, molten droplets may be formed on the surface of the workpiece at the beginning of immersion. It is thus difficult to form a continuous coating film.

The methods for measuring the softening temperature and melting temperature of the powder coating material are as described below.

The preheating temperature for the workpiece is the temperature of the workpiece when it is taken out of a heating device. When the workpiece is immersed in at least part of the powder coating material, the surface temperature of an immersed portion of the workpiece decreases by about 5° C. The time required to form a softened adhesive film of the powder coating material is about 10 seconds, within which the temperature of the workpiece decreases by about 10° C. Furthermore, softening adhesion of the powder coating material needs softening of a layer of about two particles of the powder coating material in the outer side of the powder coating material directly adsorbed to the workpiece, and the preheating temperature is preferably higher than the softening temperature by 20° C. or more, preferably by 25° C. or more. In the case of using a workpiece with a large heat capacity, a decrease in the temperature of the workpiece is reduced. In particular, in the case of precise coating on a small component serving as a workpiece, the preheating temperature needs to be determined in consideration of decreases in temperature due to the conveyance before immersion and the heat conduction to contact particles during immersion.

The immersion time for the workpiece is preferably 5 seconds or longer and 20 seconds or shorter, and more preferably 5 seconds or longer and 10 seconds or shorter to improve productivity and realize continuous thin film coating.

The temperature (hereinafter also referred to as a "baking temperature") at which a film of the powder coating material attached to the workpiece is heated is preferably 90° C. or higher and 250° C. or lower, and more preferably 100° C. or higher and 220° C. or lower. The heating time (baking time) during baking is adjusted according to the heating temperature (baking temperature).

The thickness of the coating film of the powder coating material is, for example, preferably 10 μm or more and 50 μm or less, more preferably 10 μm or more and 30 μm or less, and still more preferably 15 μm or more and 25 μm or less.

Examples of target objects to be coated with the powder coating material include, but are not limited to, various metal components, ceramic components, and resin components. These target objects may be non-formed objects before being formed into various objects, such as plate-shaped objects and line-shaped objects, or may be formed objects to be used for electronic components, road vehicles, and building interior and exterior materials. A target object may be an object in which the surface to be coated is pretreated with, for example, priming, plating, or electrodeposition.

Next, an exemplary powder coating material (hereinafter also referred to as a "powder coating material according to the exemplary embodiment") preferably used in the fluidized-bed coating method according to the exemplary embodiment will be described.

A powder coating material for fluidized-bed coating (hereinafter referred to as a "powder coating material")

according to an exemplary embodiment has a median diameter D50v of 5 µm or more and 20 µm or less and has an aerated flowability energy AE of 10 mJ or higher than 100 mJ as measured with a powder rheometer under the conditions of a rotary blade tip speed of 100 mm/sec, a rotary blade helix angle of −5°, and an air flow rate of 10 ml/min.

The powder coating material according to the exemplary embodiment further makes it easy to form a thin coating film by the fluidized-bed coating method. In particular, it is easy to form a smooth and continuous coating film. The reasons for this are assumed as described below.

The volume average particle diameter D50v is 5 µm or more and 20 µm or less.

The aerated flowability energy AE is 5 mJ or higher and lower than 100 mJ as measured with a powder rheometer using a vessel having a cross-sectional area with ø 50 mm under the conditions of a rotary blade tip speed of 100 mm/sec, a rotary blade helix angle of −5°, and an air flow rate of 20 ml/min.

The powder coating material according to the exemplary embodiment enables formation of a thin coating film by a fluidized-bed coating method. In particular, it is possible to form a smooth and continuous coating film. The reasons for this are assumed as described below.

First, for example, when the surface of a workpiece is coated with a resin coating material to ensure the electric insulation or corrosion prevention of the workpiece, a uniform coating film having a film thickness of 20 µm or more and 30 µm or less can be formed by a single coating operation in spray coating using a solvent-based coating material.

In spray coating, however, a workpiece is fixed to a pallet or the like, and a solvent-based coating material is applied to the workpiece from a distance of 200 mm or more and 300 mm or less so that the solvent-based coating material spreads out in large space. Thus, the coating efficiency of spray coating on a workpiece having a small size is as low as 10% or less. Accordingly, the coating of the entire surface of the workpiece uses a process for coating the workpiece at least two times for the front and back sides. In addition, the workpiece is refixed to the pallet in two coating operations for the front and back sides of the workpiece, and it is thus a burdensome task to fix the workpiece to the pallet multiple times.

A fluidized-bed coating method using a powder coating material involves supplying air from the bottom of a fluidized-bed vessel containing a powder coating material, immersing a workpiece in the powder coating material in the fluidized state, taking the workpiece out of the powder coating material, and then heating a film of the powder coating material attached to the workpiece to form a coating film. Accordingly, the coating efficiency is substantially 100%. Furthermore, fluidized-bed coating with no physical contact can form a coating film on the entire surface of the workpiece by a single coating operation without fixing the workpiece to the pallet. In this respect, a fluidized-bed coating method uses a powder coating material. A solvent-based coating material may be used in coating by an immersion method, such as that using a powder coating material, but a solvent-containing coating material normally has excessively high flowability, which causes dripping or excessively thin coating on edges. For this, a solvent-based coating material is unsuitable for precise coating.

For conventional powder coating materials, the minimum film thickness of a continuous film serving as a coating film is as thick as 100 µm or more. In forming a thinner continuous film, surface unevenness appears at a visually observable level, or many discontinuous sections are visually observed. It is thus very difficult to perform coating with a thin film. In particular, for small workpieces to be assembled before use, variations in size due to the thickness of the coating film directly relate to variations in assembly accuracy. It is thus difficult to use fluidized-bed coating in applications requiring advanced features under present circumstances.

The reason for this may be that the powder coating material has a large volume average particle diameter (e.g., 50 µm or more) and poor flowability.

The powder coating material according to the exemplary embodiment has a volume average particle diameter D50v as small as 5 µm or more and 20 µm or less, and shows flowability as high as an aerated flowability energy AE of 5 mJ or higher and lower than 100 mJ.

Thus, when the air in the fluidized-bed vessel is introduced into the powder coating material contained in the fluidized-bed vessel, the powder coating material becomes a fluidized state at a low floating ratio while the powder coating material maintains high bulk density. When the preheated workpiece is immersed in the powder coating material in the fluidized state and the powder coating material softens and adsorbs to the workpiece, a dense and continuous thin film of the powder coating material is formed. While the film of the powder coating material is maintained in that state, the workpiece is taken out of the powder coating material.

After the workpiece is taken out of the powder coating material, the film of the powder coating material is heated so that the powder coating material melts to form a continuous and thin coating film (e.g., a continuous coating film having a film thickness of 20 µm or more and 50 µm or less).

From the foregoing description, the powder coating material according to the exemplary embodiment is assumed to enable formation of a thin coating film by the fluidized-bed coating method.

The details of the powder coating material according to the exemplary embodiment will be described below.

Volume Average Particle Diameter

The powder coating material according to the exemplary embodiment has a volume average particle diameter D50v of 5 µm or more and 20 µm or less.

When the volume average particle diameter D50v of the powder coating material is 20 µm or less, a thin coating film can be formed by the fluidized-bed coating method. If the volume average particle diameter D50v of the powder coating material is less than 5 µm, for example, particles suspended by air flow do not readily drop, and thus the powder coating material is not maintained in a stable fluidized state, which makes continuous fluidized-bed coating difficult.

The volume average particle diameter D50v of the powder coating material is, for example, preferably 5 µm or more and 15 µm or less, and more preferably 7 µm or more and 12 µm or less.

The method for measuring the volume average particle diameter of the powder coating material is carried out as described below.

Aerated Flowability Energy AE

The powder coating material according to the exemplary embodiment has an aerated flowability energy AE of 5 mJ or higher and lower than 100 mJ.

When the aerated flowability energy AE of the powder coating material is lower than 100 mJ, the powder coating material exhibits high flowability, and the fluid phase of the powder coating material is dense. This forms a thin and dense adsorbed layer and thus forms a smooth, thin, and continuous coating film.

If the aerated flowability energy AE of the powder coating material is 5 mJ or lower, the powder coating material exhibits too high flowability, and the fluid phase of the powder coating material is too sparse, so that the amount of the powder coating material attached to the workpiece is small. It is accordingly impossible to form a dense adsorbed layer, and the formed layer becomes too thin after baking, resulting in a discontinuous coating film having a rough surface.

The aerated flowability energy AE of the powder coating material is preferably 7 mJ or higher and 80 mJ or lower, more preferably 7 mJ or higher and 60 mJ or lower, and still more preferably 10 mJ or higher and 50 mJ or lower.

The aerated flowability energy AE of the powder coating material can be adjusted according to, for example, the particle diameter and shape of the powder particles and the type and particle diameter of an external additive.

The method for measuring the aerated flowability energy AE is as described below.

The aerated flowability energy AE is measured with a powder rheometer under the conditions of a rotary blade tip speed of 100 mm/sec, a rotary blade helix angle of −5°, and an air flow rate of 10 ml/min.

The powder rheometer is a flowability measuring device that directly determines flowability by simultaneously measuring the rotary torque and the vertical load obtained by helically rotating the rotary blade in the charged powder. By simultaneously measuring the rotary torque and the vertical load, the flowability under the effect of the properties of the powder itself and the external environments is detected with high sensitivity. Since the measurement is carried out with the particle-charged state constant, the highly reproducible data are obtained.

As a powder rheometer, model FT4 available from Freeman Technology is used for measurement. To eliminate the effect of temperature and humidity before measurement, the powder coating material is left to stand at a temperature of 25° C. and a humidity of 451 RH for 8 hours or longer before use.

First, the powder coating material having a volume of 160 mL or larger is charged into a cylindrical split vessel having an inner diameter of 50 mm and having a total height of 132 mm (with a leveling section at a height of 81 mm). The split vessel has a mesh bottom from which air can be introduced.

After the powder coating material is charged into the cylindrical split vessel, an operation for homogenizing the sample is performed by gently stirring the charged powder coating material. This operation is referred to below as conditioning.

In conditioning, the sample is homogenized while most of excess air and partial stress are removed by slowly moving the rotary blade in the rotation direction in which the rotary blade experiences no resistance from the powder coating material under no load on the powder coating material in a charged state. Specific conditioning conditions include stirring in the vessel at a helix angle of 5° and a rotary blade tip speed of 60 mm/sec from a height of 100 mm to 10 mm from the bottom surface.

At this time, the propeller-shaped rotary blade rotates and moves downward simultaneously so that the tip moves along an arc. The angle of the helical path along which the propeller tip moves at this time is referred to as a helix angle.

After the conditioning operation is repeated 4 times, the upper part of the split vessel is moved gently to level the powder coating material at a height of 81 mm in the vessel, whereby the powder coating material charged in the 160-mL vessel is provided. The reason for performing the conditioning operation is that a powder with a constant volume is always stably available in order to stably obtain the amount of flowability energy.

After another conditioning operation is performed one time, the rotary torque and the vertical load are measured when the rotary blade rotates at a tip speed of 100 mm/sec while moving at a helix angle of −5° in the vessel from a height of 100 mm to 10 mm from the bottom surface. The rotation direction of the propeller at this time is the direction (right-handed rotation as seen from above) opposite to that in the conditioning.

Figure 1B:
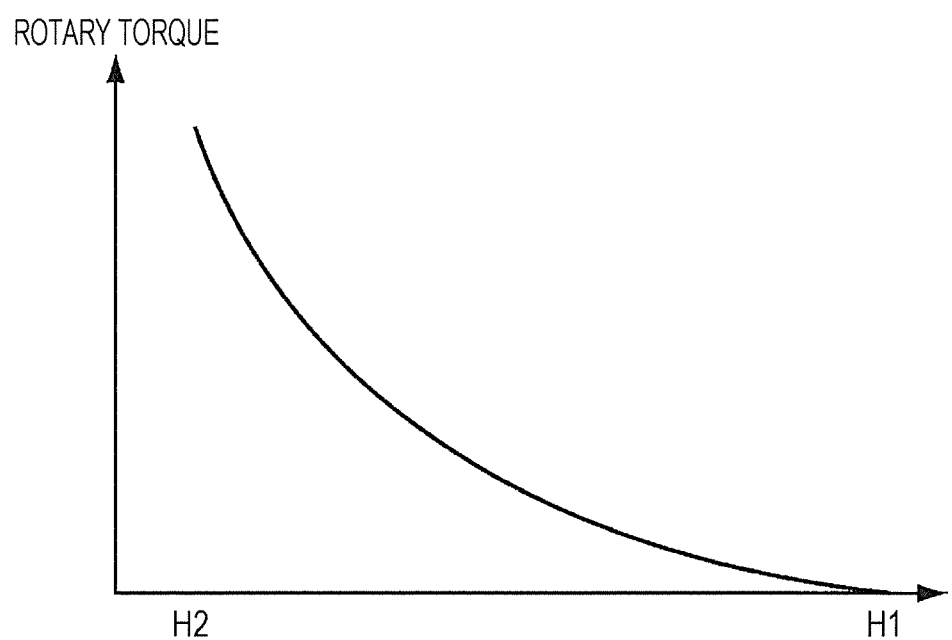
Figure 2:
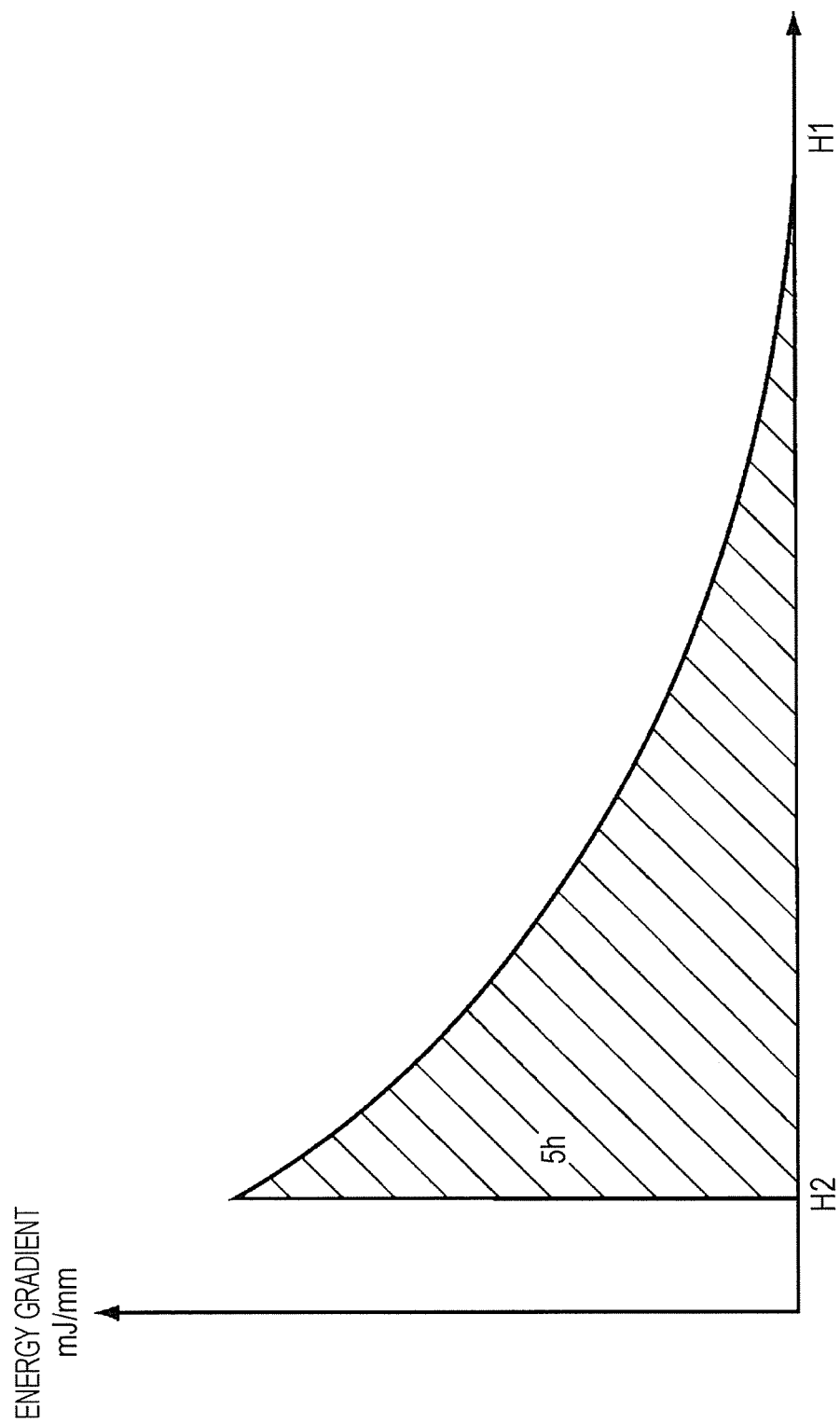
FIG. 2 is a figure showing the relationship between the vertical load and the energy gradient determined with the powder rheometer.

FIGS. 1A and 1B show the relationship between the rotary torque or the vertical load and the height H from the bottom surface. The energy gradient (mJ/mm) calculated from the rotary torque and the vertical load is plotted against the height H in FIG. 2. The area obtained by integrating the energy gradient in FIG. 2 (the hatched area in FIG. 2) represents the amount (mJ) of flowability energy. The amount of flowability energy is obtained by integrating the energy gradient in the region from a height of 10 mm to 100 mm from the bottom surface.

To reduce the effect of errors, the average value obtained by repeating a cycle of conditioning and energy measurement 5 times is defined as the amount (mJ) of flowability energy.

Figure 3:
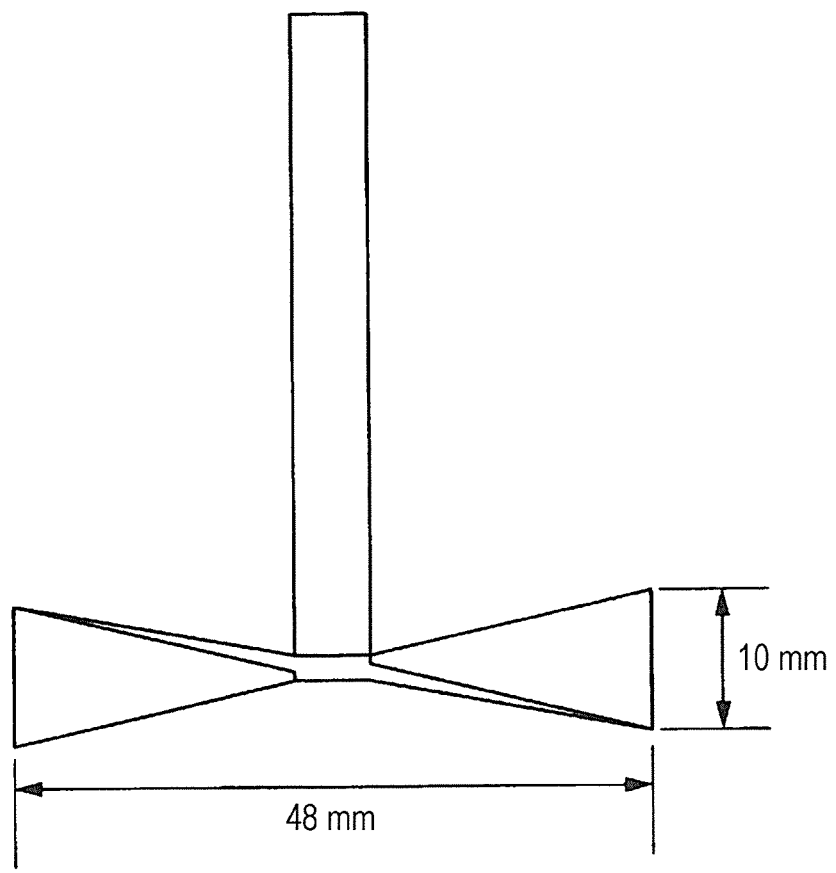
FIG. 3 is a schematic view for describing the shape of a rotary blade used in the powder rheometer.

The rotary blade is of the double-blade propeller type with ø 48.0 mm available from Freeman Technology as shown in FIG. 3.

The term "aerated flowability energy" refers to the amount of flowability energy calculated from the rotary torque and vertical load of the rotary blade measured while air is introduced from the vessel bottom at an intended air flow rate (ml/min). The inflow of the air flow rate is controlled in FT4 available from Freeman Technology.

Floating Ratio

The floating ratio of the powder coating material according to the exemplary embodiment may be 20% or lower.

At a low floating ratio, the powder coating material in the fluidized-bed vessel tends to maintain high bulk density even when it is brought into the fluidized state by introduction of air. Thus, a dense thin film of the powder coating material is easily attached to the workpiece. As a result, it is easy to form a thin continuous coating film by the fluidized-bed coating method.

If the floating ratio is too low, it is difficult to bring the powder coating material in the fluidized-bed vessel into the fluidized state by introduction of air. For this, the lower limit of the floating ratio is preferably 5% or higher, more preferably 7% or higher, still more preferably 10% or higher, and yet still more preferably 15% or higher.

In particular, the floating ratio is preferably 10% or higher and 20% or lower, and more preferably 15% or higher and 20% or lower.

The floating ratio of the powder coating material can be adjusted according to, for example, the average air flow rate, the particle diameter and shape of the powder particles, and the type and particle diameter of the external additive.

The floating ratio is the ratio of change in the bulk of the fluidized bed when the powder coating material is placed in the fluidized-bed vessel and air flows from the bottom of the fluidized-bed vessel.

The floating ratio is a value when the powder coating material is placed in the fluidized-bed vessel and air is introduced from the bottom of the fluidized-bed vessel at an average air flow rate of 5 mm/min or higher and 10 mm/min or lower per unit area of the bottom.

The floating ratio is calculated from the following formula H.

Floating ratio (%)=(H2−H1)/H1×100    Formula H:

In formula H, H1 represents the height of the surface of the powder coating material contained in the fluidized-bed vessel with no air introduced (i.e., the height from the bottom of the fluidized-bed vessel to the surface of the powder coating material).

H2 represents the height of the surface of the powder coating material contained in the fluidized-bed vessel with air introduced (i.e., the height from the bottom of the fluidized-bed vessel to the surface of the powder coating material).

The average air flow rate is obtained by dividing the volume of air introduced per unit time (min) from the bottom of the fluidized-bed vessel by the area of the bottom (the surface from which air is introduced) of the fluidized-bed vessel. Since the fluidized-bed vessel may have any cross-sectional area in fluidized-bed coating, the average air flow rate is used to express the immersion condition.

For example, a fluidized-bed vessel having a cross-sectional area with ø 50 mm has a bottom area of about 2000 mm$^2$, and an air flow of 20 ml/min in this fluidized-bed vessel corresponds to an average air flow rate of 10 mm/min.

Other Properties

The volume particle size distribution index GSDv of the powder coating material is preferably 1.15 or higher and 1.40 or lower, more preferably 1.15 or higher and 1.30 or lower, and still more preferably 1.15 or higher and 1.25 or lower in order to form a thin coating film by the fluidized-bed coating method. Even if the particle size distribution is inadequate, there is no noticeable degradation in coating quality at the beginning, but the particle diameter distribution of the remaining particles may change gradually in continuous coating, possibly resulting in unstable quality.

The average circularity of the powder coating material is preferably 0.9 or higher and 0.995 or lower, more preferably 0.93 or higher and 0.995 or lower, and still more preferably 0.96 or higher and 0.995 or lower in order to form a thin coating film by the fluidized-bed coating method.

The volume average particle diameter D50v and volume particle size distribution index GSDv of the powder coating material are measured by using Coulter Multisizer II (available from Beckman Coulter, Inc.) and electrolyte ISOTON-II (available from Beckman Coulter, Inc.).

Before measurement, 0.5 mg or more and 50 mg or less of a test sample is added to 2 ml of a 5% by mass aqueous solution of a surfactant (e.g., sodium alkylbenzene sulfonate) serving as a dispersant. The resulting mixture is added to 100 ml or more and 150 ml or less of the electrolyte.

The electrolyte in which the sample is suspended is subjected to a dispersion treatment using an ultrasonic disperser for 1 minute, and the particle size distribution of particles having a particle diameter in the range of 1 µm or more and 30 µm or less is measured by using Coulter Multisizer II with an aperture having a diameter of 50 µm. The number of sampled particles is 50,000.

The volume-based cumulative distribution is drawn from the smaller particle diameter side for particle size ranges (channels) divided on the basis of the measured particle size distribution. The particle diameter at a cumulative percentage of 16% is defined as a volume average particle diameter D16v, the particle diameter at a cumulative percentage of 50% as a volume average particle diameter D50v, and the particle diameter at a cumulative percentage of 84% as a volume average particle diameter D84v. The volume particle size distribution index GSDv is calculated as (D84v/D16v).

The average circularity of the powder coating material is measured by using a flow particle image analyzer (FPIA-3000 available from Sysmex Corporation). Specifically, 0.1 ml or more and 0.5 ml or less of a surfactant (alkylbenzene sulfonate) is added as a dispersant to 100 ml or more and 150 ml or less of water from which solid impurities have been removed in advance, and 0.1 g or more and 0.5 g or less of a test sample is added thereto. The suspension in which the test sample is dispersed is subjected to a dispersion treatment using an ultrasonic disperser for 1 minute or longer and 3 minutes or shorter, and the dispersion concentration is adjusted to 3,000 particles/µl or more and 10,000 particles/µl or less. The average circularity of the powder particles in this dispersion is measured by using the flow particle image analyzer.

The average circularity of the powder particles is calculated according to the following formula from the circularity (Ci) of each of n measured powder particles. In the following formula, Ci represents a circularity (=the circumference of a circle having an area equal to the projected area of a particle/the circumference of the projected particle image), and fi represents a frequency of the powder particles.

$$\text{Average circularity } (Ca) = \left(\sum_{i=1}^{n}(Ci \times fi)\right) / \sum_{i=1}^{n}(fi)$$

The softening temperature Tg of the powder coating material according to the exemplary embodiment is preferably 45° C. or higher and 70° C. or lower, and more preferably 50° C. or higher and 65° C. or lower in order to ensure the storage stability of the coating material and ensure smoothness during baking.

The softening temperature of the powder coating material is a glass transition temperature, and the method for measuring the glass transition temperature is as described below. The glass transition temperature is determined from the DSC curve obtained by differential scanning calorimetry (DSC) and, more specifically, determined in accordance with "extrapolated glass transition onset temperature" described in the method for determining the glass transition temperature in JIS K 7121-1987 "Testing Methods for Transition Temperatures of Plastics".

The melting temperature Tm of the powder coating material according to the exemplary embodiment is preferably 80° C. or higher and 180° C. or lower, and more preferably 90° C. or higher and 160° C. or lower in order to ensure latitude in preheating temperature, to increase the versatility of the workpiece, and to reduce energy consumption.

The method for measuring the melting temperature of the powder coating material is as described below.

The melting temperature is determined, by using a Koka flow tester CFT-500 (available from Shimadzu Corporation), as a temperature of the outflow start point at which 1 cm$^3$ of the sample melts and flows out under the conditions of a die pore diameter of 0.5 mm, a pressure load of 0.98 MPa (10 kgf/cm$^2$), and a heating rate of 1° C./min.

Configuration

The powder coating material according to the exemplary embodiment includes, for example, powder particles and an external additive.

Powder Particles

The powder particles contain a resin. The powder particles may contain a colorant and other additives.

Resin

The resin may be either a thermoplastic resin or a thermosetting resin.

The resin may be a thermosetting resin in order to improve the strength of a coating film. When a thermosetting resin is used as a resin, the thermosetting resin may be used in combination with a thermoplastic resin. For example, the proportion of the thermoplastic resin in the entire resin is preferably 5% by mass or lower, more preferably 1% by mass or lower, and still more preferably substantially zero in order to improve the curing density (crosslinking density) of the coating film. In other words, the resin contained in the powder particles may be only a thermosetting resin. When a thermosetting resin and a thermoplastic resin are used in combination, these resins may be of the same type.

When a thermosetting resin is used as a resin, the powder particles further contain a thermosetting agent.

Examples of the thermoplastic resin include vinyl resins composed of a homopolymer of a monomer or a copolymer of two or more monomers of, for example, styrenes (e.g., styrene, p-chlorostyrene, α-methylstyrene), (meth)acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate), ethylenically unsaturated nitriles (e.g., acrylonitrile, methacrylonitrile), vinyl ethers (e.g., vinyl methyl ether, vinyl isobutyl ether), vinyl ketones (e.g., vinyl methyl ketone, vinyl ethyl ketone, vinyl isopropenyl ketone), and olefins (e.g., ethylene, propylene, butadiene).

Examples of the thermoplastic resin include non-vinyl resins, such as epoxy resins, polyester resins, polyurethane resins, polyamide resins, cellulose resins, polyether resins, and modified rosins; and mixtures of these non-vinyl resins and the above vinyl resins, and graft polymers obtained by polymerization of a vinyl monomer in the presence of these non-vinyl resins.

These thermoplastic resins may be used alone or in combination of two or more.

The thermosetting resin is a resin having a thermosetting reactive group. Examples of the thermosetting resin include various thermosetting resins that have been used for powder particles of powder coating materials.

Examples of the thermosetting resin include a thermosetting epoxy resin, a thermosetting (meth)acrylic resin, a thermosetting silicone resin, a thermosetting phenolic resin, a thermosetting polyimide resin, a thermosetting polyurethane resin, a thermosetting melamine resin, and a thermosetting urea resin.

The thermosetting resin may be a water-insoluble (hydrophobic) resin. The use of a water-insoluble (hydrophobic) resin as a thermosetting resin reduces the environment dependency of the powder coating material (powder particles). When the powder particles are produced by an aggregation-coalescence method, the thermosetting resin may be a water-insoluble (hydrophobic) resin in order to achieve emulsification and dispersion in an aqueous medium. The term "water-insoluble (hydrophobic)" means that the amount of a target substance dissolved in 100 parts by mass of water at 25° C. is less than 5 parts by mass.

The thermosetting resin may be at least one selected from the group consisting of thermosetting (meth)acrylic resins and thermosetting polyester resins.

Thermosetting (Meth)Acrylic Resin

The thermosetting (meth)acrylic resin is a (meth)acrylic resin having a thermosetting reactive group. The introduction of a thermosetting reactive group into the thermosetting (meth)acrylic resin may be carried out by using a vinyl monomer having a thermosetting reactive group. The vinyl monomer having a thermosetting reactive group may be a (meth)acrylic monomer (a monomer having a (meth)acryloyl group) or may be a vinyl monomer other than a (meth)acrylic monomer.

Examples of the thermosetting reactive group of the thermosetting (meth)acrylic resin include an epoxy group, a carboxyl group, a hydroxyl group, an amide group, an amino group, an acid anhydride group, and a (block) isocyanate group. Among these groups, the thermosetting reactive group of the (meth)acrylic resin may be at least one selected from the group consisting of an epoxy group, a carboxyl group, and a hydroxyl group in order to facilitate production of the (meth)acrylic resin. At least one of thermosetting reactive groups may be an epoxy group in order to improve the storage stability of the powder coating material and the coating film appearance.

Examples of vinyl monomers having an epoxy group as a thermosetting reactive group include various chain epoxy group-containing monomers (e.g., glycidyl (meth)acrylate, β-methyl glycidyl (meth)acrylate, glycidyl vinyl ether, and allyl glycidyl ether), various (2-oxo-1,3-dioxolane) group-containing vinyl monomers (e.g., (2-oxo-1,3-dioxolane) methyl (meth)acrylate), and various alicyclic epoxy group-containing vinyl monomers (e.g., 3,4-epoxycyclohexyl (meth)acrylate, 3,4-epoxycyclohexylmethyl (meth)acrylate, and 3,4-epoxycyclohexylethyl (meth)acrylate).

Examples of vinyl monomers having a carboxyl group as a thermosetting reactive group include various carboxyl group-containing monomers (e.g., (meth)acrylic acid, crotonic acid, itaconic acid, maleic acid, and fumaric acid), various monoesters of α,β-unsaturated dicarboxylic acid and a monohydric alcohol having 1 to 18 carbon atoms (e.g., monomethyl fumarate, monoethyl fumarate, monobutyl fumarate, monoisobutyl fumarate, mono-tert-butyl fumarate, monohexyl fumarate, monooctyl fumarate, mono-2-ethylhexyl fumarate, monomethyl maleate, monoethyl maleate, monobutyl maleate, monoisobutyl maleate, mono-tert-butyl maleate, monohexyl maleate, monooctyl maleate, and mono-2-ethylhexyl maleate), and various monoalkyl itaconates (e.g., monomethyl itaconate, monoethyl itaconate, monobutyl itaconate, monoisobutyl itaconate, monohexyl itaconate, monooctyl itaconate, and mono-2-ethylhexyl itaconate).

Examples of vinyl monomers having a hydroxyl group as a thermosetting reactive group include various hydroxyl group-containing (meth)acrylates (e.g., 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate), addition reaction products between these various hydroxyl group-containing (meth)acrylates and ε-caprolactone, various hydroxyl group-containing vinyl ethers (e.g., 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), addition reaction products between these various hydroxyl group-containing vinyl ethers and ε-caprolactone, various hydroxyl group-containing allyl ethers (e.g., 2-hydroxyethyl (meth) allyl ether, 3-hydroxypropyl (meth)allyl ether, 2-hydroxypropyl (meth)allyl ether, 4-hydroxybutyl (meth)allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether), and addition reaction products of these various hydroxyl group-containing allyl ethers and ε-caprolactone.

Examples of (meth)acrylic monomers without a thermosetting reactive group, which serve as a structural unit of the thermosetting (meth)acrylic resin, include alkyl (meth)acrylates (e.g., methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth)acrylate, isodecyl (meth)acrylate, lauryl (meth)acrylate, and stearyl (meth)acrylate); various aryl (meth)acrylates (e.g., benzyl (meth)acrylate, phenyl (meth)acrylate, phenoxyethyl (meth)acrylate); various alkyl carbitol (meth)acrylates (e.g., ethyl carbitol (meth)acrylate); various (meth)acrylates (e.g., isobornyl (meth)acrylate, dicyclopentanyl (meth)acrylate, dicyclopentenyl (meth)acrylate, dicyclopentenyloxyethyl (meth)acrylate, tetrahydrofurfuryl (meth)acrylate); various amino group-containing amide unsaturated monomers (e.g., N-dimethylaminoethyl (meth)acrylamide, N-diethylaminoethyl (meth)acrylamide, N-dimethylaminopropyl (meth)acrylamide, and N-diethylaminopropyl (meth)acrylamide); various dialkylaminoalkyl (meth)acrylates (e.g., dimethylaminoethyl (meth)acrylate, and diethylaminoethyl (meth)acrylate); and various amino group-containing monomers (e.g., tert-butylaminoethyl (meth)acrylate, tert-butylaminopropyl (meth)acrylate, aziridinylethyl (meth)acrylate, pyrrolidinylethyl (meth)acrylate, and piperidinylethyl (meth)acrylate).

The thermosetting (meth)acrylic resin may contain other vinyl monomers without a thermosetting reactive group in addition to the (meth)acrylic monomer.

Examples of other vinyl monomers include various α-olefins (e.g., ethylene, propylene, and butene-1), various halogenated olefins (e.g., vinyl chloride and vinylidene chloride) other than fluoroolefin, various aromatic vinyl monomers (e.g., styrene, α-methylstyrene, and vinyltoluene), various diesters of unsaturated dicarboxylic acids and a monohydric alcohol having 1 to 18 carbon atoms (e.g., dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate), various acid anhydride group-containing monomers (e.g., maleic anhydride, itaconic anhydride, citraconic anhydride, (meth)acrylic anhydride, and tetrahydrophthalic anhydride), various phosphoester group-containing monomers (e.g., diethyl-2-(meth)acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate), various hydrolyzable silyl group-containing monomers (e.g., γ-(meth)acryloyloxypropyl trimethoxysilane, γ-(meth)acryloyloxypropyl triethoxysilane, and γ-(meth)acryloyloxypropylmethyl dimethoxysilane), various aliphatic vinyl carboxylates (e.g., vinyl acetate, vinyl propionate, vinyl butyrate, vinyl isobutyrate, vinyl caproate, vinyl caprylate, vinyl caprate, vinyl laurate, branched aliphatic vinyl carboxylates having 9 to 11 carbon atoms, and vinyl stearate), and various vinyl esters of carboxylic acids having a cyclic structure (e.g., vinyl cyclohexanecarboxylate, vinyl methylcyclohexanecarboxylate, vinyl benzoate, and vinyl p-tert-butylbenzoate).

The number average molecular weight of the thermosetting (meth)acrylic resin is preferably 1,000 or more and 20,000 or less, and more preferably 1,500 or more and 15,000 or less in order to improve the smoothness of a coating film.

The weight average molecular weight and the number average molecular weight of the thermosetting (meth)acrylic resin are determined by gel permeation chromatography (GPC). The determination of the molecular weight by GPC is carried out by using a GPC HLC-8120GPC available from Tosoh Corporation as a measuring system, a column TSKgel SuperHM-M (15 cm) available from Tosoh Corporation, and a THF solvent. The weight average molecular weight and the number average molecular weight are calculated from the molecular weight calibration curve created on the basis of the obtained measurement results using a monodisperse polystyrene standard.

Thermosetting Polyester Resin

A thermosetting polyester resin is, for example, a polycondensate prepared by polycondensation of at least a polybasic acid and a polyhydric alcohol. The introduction of a thermosetting reactive group into the thermosetting polyester resin is carried out while the amounts of the polybasic acid and the polyhydric alcohol are controlled. This control provides a thermosetting polyester resin having at least one of a carboxyl group and a hydroxyl group as a thermosetting reactive group.

Examples of the polybasic acid include terephthalic acid, isophthalic acid, phthalic acid, methylterephthalic acid, trimellitic acid, pyromellitic acid, and anhydrides of these acids; succinic acid, adipic acid, azelaic acid, sebacic acid, and anhydrides of these acids; maleic acid, itaconic acid, and anhydrides of these acids; fumaric acid, tetrahydrophthalic acid, methyltetrahydrophthalic acid, hexahydrophthalic acid, methylhexahydrophthalic acid, and anhydrides of these acids; and cyclohexanedicarboxylic acid and 2,6-naphthalenedicarboxylic acid.

Examples of the polyhydric alcohol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis(hydroxyethyl)terephthalate, cyclohexane dimethanol, octanediol, diethyl propanediol, butyl ethyl propanediol, 2-methyl-1,3-propanediol, 2,2,4-trimethyl pentanediol, hydrogenated bisphenol A, an ethylene oxide adduct of hydrogenated bisphenol A, a propylene oxide adduct of hydrogenated bisphenol A, trimethylolethane, trimethylolpropane, glycerol, pentaerythritol, tris(hydroxyethyl) isocyanurate, and hydroxy pivalyl hydroxy pivalate.

The thermosetting polyester resin may be a polycondensate containing other monomers other than polybasic acids and polyhydric alcohols.

Examples of other monomers include compounds having both a carboxyl group and a hydroxyl group in one molecule (e.g., dimethanol propionic acid and hydroxy pivalate); mono-epoxy compounds (e.g., glycidyl esters of branched aliphatic carboxylic acids, such as "Cardura E10 (Shell Chemicals)"; various monohydric alcohols (e.g., methanol, propanol, butanol, and benzyl alcohol); various monobasic acids (e.g., benzoic acid and p-tert-butyl benzoic acid); and various fatty acids (e.g., castor oil fatty acid, palm oil fatty acid, and soybean oil fatty acid).

The thermosetting polyester resin may have a branched structure or a linear structure.

To improve the smoothness of a coating film, the thermosetting polyester resin may be such that the sum of the acid value and the hydroxyl value is 10 mg KOH/g or more and 250 mg KOH/g or less, and the number average molecular weight is 1,000 or more and 10,000 or less.

Glass Transition Temperature of Thermosetting Resin

The glass transition temperature (Tg) of the thermosetting resin is preferably 65° C. or lower and more preferably 60° C. or lower in order to improve the smoothness of a coating film even when the thermosetting resin is baked at a low temperature. The glass transition temperature (Tg) of the thermosetting resin may be 40° C. or higher in order to suppress blocking or the like to ensure storage stability.

Amount of Thermosetting Resin

The thermosetting resin may be used alone or in combination of two or more.

The amount of the thermosetting resin is preferably 20% by mass or higher and 99% by mass or lower, and more preferably 30% by mass or higher and 95% by mass or lower relative to the entire powder particles.

When the powder particles are core/shell particles as described below and a thermosetting resin is used as a resin in the resin coating, the amount of the thermosetting resin means the total amount of the thermosetting resin in the core and the resin coating.

Thermosetting Agent

The thermosetting agent is selected according to the type of thermosetting reactive group of the thermosetting resin.

When the thermosetting reactive group of the thermosetting resin is an epoxy group, specific examples of the thermosetting agent include acids, such as succinic acid, glutaric acid, adipic acid, pimelic acid, suberic acid, azelaic acid, sebacic acid, dodecanedioic acid, eicosane diacid, maleic acid, citraconic acid, itaconic acid, glutaconic acid, phthalic acid, trimellitic acid, pyromellitic acid, tetrahydrophthalic acid, hexahydrophthalic acid, cyclohexene-1,2-dicarboxylic acid, trimellitic acid, pyromellitic acid; anhydrides of these acids; and urethane modified products of these acids. Among these, the thermosetting agent is preferably an aliphatic dibasic acid in view of coating film physical properties and storage stability, and more preferably dodecanedioic acid in view of coating film physical properties.

When the thermosetting reactive group of the thermosetting resin is a carboxyl group, examples of the thermosetting agent include various epoxy resins (e.g., polydiglycidyl ether of bisphenol A), epoxy group-containing acrylic resins (e.g., glycidyl group-containing acrylic resins), polyglycidyl ethers of various polyhydric alcohols (e.g., 1,6-hexanediol, trimethylolpropane, and trimethylolethane), polyglycidyl esters of various polyvalent carboxylic acids (e.g., phthalic acid, terephthalic acid, isophthalic acid, hexahydrophthalic acid, methylhexahydrophthalic acid, trimellitic acid, and pyromellitic acid), various alicyclic epoxy group-containing compounds (e.g., bis(3,4-epoxycyclohexyl)methyl adipate), and hydroxyamides (e.g., triglycidyl isocyanurate and 13-hydroxy alkylamide).

When the thermosetting reactive group of the thermosetting resin is a hydroxyl group, examples of the thermosetting agent include blocked isocyanates and aminoplast. Examples of isocyanate compounds that form blocked isocyanates include organic diisocyanates, polymers of organic diisocyanates (including isocyanurate-type polyisocyanate compounds), polyhydric alcohol adducts of organic diisocyanates, low-molecular-weight polyester resin (e.g., polyester polyol) adducts of organic diisocyanates, and water adducts of organic diisocyanates. Examples of organic diisocyanates include various aliphatic diisocyanates (e.g., hexamethylene diisocyanate and trimethyl hexamethylene diisocyanate), various cyclic aliphatic diisocyanates (e.g., xylylene diisocyanate and isophorone diisocyanate), and various aromatic diisocyanates (e.g., tolylene diisocyanate and 4,4'-diphenylmethane diisocyanate). Examples of blocking agents for the isocyanate group include oxime compounds, such as formaldoxime, acetaldoxime, acetoxime, methyl ethyl ketoxime, methyl isobutyl ketoxime, and cyclohexanone oxime.

These thermosetting agents may be used alone or in combination of two or more.

The amount of the thermosetting agent is preferably 1% by mass or higher and 30% by mass or lower, and more preferably 3% by mass or higher and 20% by mass or lower relative to the amount of the thermosetting resin contained in the powder particles.

When the powder particles are core/shell particles as described below and a thermosetting resin is used as a resin of the resin coating, the amount of the thermosetting agent means the amount of the thermosetting agent relative to the total amount of the thermosetting resin in the core and the resin coating.

Colorant

Examples of the colorant include pigments. The colorant may be a combination of a pigment and a dye.

Examples of pigments include inorganic pigments, such as iron oxides (e.g., bengala), titanium oxide, titanium yellow, zinc oxide, white lead, zinc sulfide, lithopone, antimony oxide, cobalt blue, and carbon black; and organic pigments, such as quinacridone red, phthalocyanine blue, phthalocyanine green, permanent red, Hansa yellow, indanthrene blue, brilliant fast scarlet, and benzimidazolone yellow.

Examples of the pigment further include bright pigments. Examples of bright pigments include metal powders, such as pearl pigments, aluminum powder, and stainless steel powder; metal flakes; glass beads; glass flakes; mica; and micaceous iron oxide (MIO).

The colorants may be used alone or in combination of two or more.

The amount of the colorant is selected according to, for example, the type of pigment, and the hue, lightness, and depth required for the coating film. For example, the amount of the colorant is preferably to by mass or higher and 70% by mass or lower and more preferably 2% by mass or higher and 60% by mass or lower relative to the total amount of the resin in the powder particles.

Other Additives

Examples of other additives include various additives used for powder coating materials. Specific examples of other additives include surface conditioners (e.g., silicone oil and acrylic oligomer), anti-foaming (de-foaming) agents (e.g., benzoin and benzoin derivatives), curing accelerators (e.g., amine compounds, imidazole compounds, cationic polymerization catalysts), plasticizers, charge control agents, antioxidants, pigment dispersants, flame retardants, and fluidity-imparting agents.

Properties of Powder Particles

The volume average particle diameter D50v of the powder particles is preferably 5 μm or more and 20 μm or less, more preferably 5 μm or more and 15 μm or less, and still more preferably 7 μm or more and 12 μm or less in order to more uniformly attach the powder coating material to the surface to be coated and, as a result, to improve the distinctness of image in the coating film.

Core/Shell Particles

The powder particles may be core/shell particles each having a core and a resin coating that covers the core. In this case, the core may contain a resin and, as necessary, other additives, such as a colorant, described above.

The resin coating of the core/shell particles will be described below.

The resin coating may be composed only of resin or may contain other components (e.g., the thermosetting agent described as a component contained in the core, and other additives).

To reduce bleeding, the resin coating may be composed only of resin. Even when the resin coating contains components other than the resin, the resin may account for 90% by mass or higher (or 95% by mass or higher) of the entire resin coating.

The resin that forms the resin coating may be either a thermoplastic resin or a thermosetting resin, but preferably a thermosetting resin in order to improve the curing density (crosslinking density) of the coating film.

When a thermosetting resin is used as the resin of the resin coating, examples of the thermosetting resin include the same resins as for the thermosetting resin of the core, and suitable examples of the thermosetting resin are also the same as those of the thermosetting resin of the core. The thermosetting resin of the resin coating may be the same as or different from the thermosetting resin of the core.

The coverage of the resin coating is preferably 30% or more and 100% or less, and more preferably 50% or more and 100% or less in order to suppress bleeding.

The coverage of the resin coating on the surface of the powder particles is measured by X-ray photoelectron spectrometry (XPS).

Specifically, the XPS measurement is carried out by using JPS-9000MX available from JEOL Ltd. as a measuring device and a Mg K$\alpha$ ray as an X-ray source at an acceleration voltage of 10 kV and an emission current of 30 mA.

From the spectrum obtained under the above conditions, the peaks of the components from the materials of the core in the surface of the powder particles are separated from the peaks of the components from the materials of the coating resin, whereby the coverage of the resin coating on the surfaces of the powder particles is determined. In peak separation, the measured spectrum is separated into components by using curve fitting based on the least square method.

The component spectrums which are bases of separation are obtained by independently measuring the thermosetting resin, the thermosetting agent, the pigment, the additives, and the coating resin used to prepare the powder particles. The coverage is obtained from the proportion of the spectral intensity from the coating resin relative to the sum of all spectral intensities obtained from the powder particles.

The thickness of the resin coating is preferably 0.2 µm or more and 4 µm or less, and more preferably 0.3 µm or more and 3 µm or less in order to suppress bleeding.

The thickness of the resin coating is measured in accordance with the following method. The powder particles are embedded in epoxy resin or the like, and the resulting article is cut into a thin section by using a diamond knife or the like. The cross-sectional image of powder particles in the thin section is observed and captured with a transmission electron microscope (TEM) or the like. The thickness of the resin coating is measured at 20 points in the cross-sectional image of the powder particles, and the average thickness is obtained. If it is difficult to observe the resin coating in the cross-sectional image because of a clear powder coating material or the like, observation after staining facilitates measurement.

External Additive

Examples of the external additive include inorganic particles. Examples of inorganic particles include particles made of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O$—$(TiO_2)$ $Al_2O_3 \cdot 2SiO_2$, $CaCO_3$, $MgCO_3$, $BaSO_4$, or $MgSO_4$.

Among these inorganic particles, silica particles may be used as the external additive. The silica particles are any particles containing $SiO_2$ as a main component and may be crystalline or amorphous. The silica particles may be particles produced by using a silicon compound, such as water glass or alkoxysilane, as a raw material, or may be particles made by grinding quartz.

Specifically, examples of the silica particles include sol-gel silica particles, aqueous colloidal silica particles, alcoholic silica particles, fumed silica particles obtained by the gas phase method, and fused silica particles.

The external additive may be a hydrophobic external additive. The use of a hydrophobic external additive makes it easy to control the aerated flowability energy and the floating ratio in the above ranges.

The hydrophobic external additive has a hydrophobized surface. Hydrophobization is performed by, for example, immersing the external additive (e.g., inorganic particles) in a hydrophobizing agent. Examples of the hydrophobizing agent include, but are not limited to, a silane coupling agent, silane, silicone oil, a titanate coupling agent, and an aluminum coupling agent. These hydrophobizing agents may be used alone or in combination of two or more. The amount of the hydrophobizing agent is, for example, 1 part by mass or more and 10 parts by mass or less per 100 parts by mass of the inorganic particles.

The degree of hydrophobicity of the hydrophobic external additive is preferably 60% or higher, more preferably 70% or higher, and still more preferably 80% or higher in order to control the aerated flowability energy and the floating ratio in the above ranges.

The degree of hydrophobicity of the external additive is obtained as follows: placing 0.2% by mass of silica particles serving as a sample in 50 ml of ion exchange water; adding methanol dropwise from a burette under stirring with a magnetic stirrer; and obtaining, as the degree of hydrophobicity, the methanol mass percentage in the methanol-water mixed solution at the end point at which the total amount of the sample sinks.

The volume average particle diameter of the external additive is preferably 5 nm or more and 30 nm or less, more preferably 5 nm or more and 20 nm or less, still more preferably 5 nm or more and 10 nm or less, and yet still more preferably 5 nm or more and 9 nm or less. When the volume average particle diameter of the external additive is in the above range, it is easy to control the aerated flowability energy and the floating ratio in the above ranges.

The volume average particle diameter of the external additive is measured as described below.

The powder coating material having the external additive externally added thereto is captured at a magnification of 40,000 times with a scanning electron microscope (SEM) (S-4700 available from Hitachi High-Technologies Corporation) and observed at an acceleration voltage of 15 kV, an emission current of 20 µA, and a WD of 15 mm. The specified external additive is analyzed by using imaging analysis software WinRoof (available from MITANI Corporation) to obtain the equivalent circle diameter of the external additive. The particle diameter (equivalent circle diameter) of at least 200 particles is measured to obtain the volume average particle diameter, which is the particle diameter at a cumulative percentage of 50% from the smaller particle diameter side in the volume-based particle diameter distribution.

The amount of the external additive externally added is, for example, 0.01% by mass or higher and 10% by mass or lower, and more preferably 0.1% by mass or higher and 7.0% by mass or lower relative to the powder particles.

Method for Producing Powder Coating Material

Next, the method for producing the powder coating material according to the exemplary embodiment will be described.

The powder coating material according to the exemplary embodiment is obtained by externally adding an external additive to powder particles as necessary after production of the powder particles.

The powder particles may be produced by using any one of dry production methods (e.g., a kneading-grinding method) and wet production methods (e.g., an aggregation-coalescence method, a suspension-polymerization method, and a dissolution-suspension method). The method is not limited to these production methods, and a known production method is employed. Among these methods, an aggregation-coalescence method may be used to produce the powder particles because it is easy to control the aerated flowability energy and the floating ratio in the above ranges.

Specifically, the powder particles may be produced through the following steps:

a first aggregation step of causing resin-containing composite particles to aggregate in a dispersion of the composite particles to form first aggregated particles;

a second aggregation step of mixing a first aggregated particle dispersion in which the first aggregated particles are dispersed and a second resin particle dispersion in which resin-containing second resin particles are dispersed, so that the second resin particles aggregate on the surfaces of the first aggregated particles to form second aggregated particles in which the second resin particles are attached to the surfaces of the first aggregated particles; and a step of fusing and coalescing the second aggregated particles by heating a second aggregated particle dispersion in which the second aggregated particles are dispersed.

In the powder particles produced by the aggregation-coalescence method, the first aggregated particles aggregate and coalesce into the core, and the second resin particles attached to the surfaces of the first aggregated particles aggregate and coalesce into the resin coating. When a thermosetting resin is used as a resin, each dispersion may contain a thermosetting agent, or a dispersion containing a thermosetting agent may be used separately.

The powder particles having a single layer structure may be produced without the second aggregation step.

The details of each step will be described below. In the following description, a method for producing powder particles containing a colorant by using a thermosetting resin as a resin will be described.

Dispersion Preparing Step

First, each dispersion used in the aggregation-coalescence method is prepared. Specifically, the following dispersions are prepared: a first resin particle dispersion in which first resin particles containing the resin of the core are dispersed; a thermosetting agent dispersion in which a thermosetting agent is dispersed; a colorant dispersion in which a colorant is dispersed; and a second resin particle dispersion in which second resin particles containing the resin of the resin coating are dispersed.

In the following description, the first resin particles, the second resin particles, and the composite particles are collectively referred to as "resin particles".

A resin particle dispersion is prepared by, for example, dispersing resin particles in a dispersion medium by using a surfactant.

Examples of the dispersion medium used for the resin particle dispersion include an aqueous medium.

Examples of the aqueous medium include water, such as distilled water and ion exchange water, and alcohols. These aqueous media may be used alone or in combination of two or more.

Examples of the surfactant include anionic surfactants, such as sulfate salts, sulfonate salts, phosphate salts, and soaps; cationic surfactants, such as amine salts and quaternary ammonium salts; and nonionic surfactants, such as polyethylene glycols, alkylphenol ethylene oxide adducts, and polyhydric alcohols. Among these surfactants, in particular, anionic surfactants and cationic surfactants may be used. A nonionic surfactant may be used in combination with an anionic surfactant or a cationic surfactant.

The surfactants may be used alone or in combination of two or more.

Examples of the method for dispersing resin particles in a dispersion medium to prepare a resin particle dispersion include ordinary dispersion methods using a rotary shear homogenizer, a ball mill having media, a sand mill, and Dyno-Mill. Depending on the type of resin particles, for example, a phase-inversion emulsification method may be used to disperse resin particles in a resin particle dispersion.

The phase-inversion emulsification method is a method for dispersing a resin in the form of particles in an aqueous medium. This method involves dissolving a target resin in a hydrophobic organic solvent capable of dissolving the resin; adding a base to an organic continuous phase (O phase) to cause neutralization; and then adding an aqueous medium (W phase) to cause resin conversion (so called phase inversion) from W/O to O/W, forming a discontinuous phase.

Specifically, in the case of (meth)acrylic resin particle dispersion, a resin particle dispersion in which (meth)acrylic resin particles are dispersed is obtained, for example, by emulsifying, in an aqueous medium, a monomer for forming a (meth)acrylic resin, adding a water-soluble initiator and a chain transfer agent, and heating the mixture to induce emulsion polymerization.

In the case of polyester resin particle dispersion, a resin particle dispersion in which polyester resin particles are dispersed is obtained, for example, by thermally melting a monomer for forming a polyester resin to cause polycondensation under a reduced pressure, adding a solvent (e.g., ethyl acetate) to the obtained polycondensate, and further adding an alkaline aqueous solution under stirring to cause phase-inversion emulsification.

The polyester resin is neutralized by using a basic compound in dispersing the polyester resin in the aqueous medium. The neutralization reaction between the basic compound and the carboxyl group of the thermosetting polyester resin generates a driving force of hydrophilization. In addition, electrical repulsion between the generated carboxy anions tends to prevent aggregation of particles.

Examples of the basic compound include ammonia and organic amine compounds having a boiling point of 250° C. or lower. The amount of ammonia is preferably 10 mol % or more, more preferably 25 mol % or more, and still more preferably 50 mol, or more relative to the total amount of the basic compound used. The ammonium ion content in the powder coating material is controlled by performing the neutralization reaction using ammonia. Examples of suitable organic amine compounds include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine, and N-ethylmorpholine.

Depending on the carboxyl group contained in the thermosetting polyester resin, the basic compound is added in an amount sufficient to at least partially neutralize the carboxyl group, that is, preferably in an amount of 0.2 times equivalent or more and 9.0 times equivalent or less of the carboxyl group, more preferably in an amount of 0.6 times equivalent or more and 2.0 times equivalent or less of the carboxyl group. When the amount of the basic compound is 0.2 times equivalent or more of the carboxyl group, the effects of basic compound addition tends to be observed. When the amount of the basic compound is 9.0 times equivalent or less of the carboxyl group, it is easy to provide a favorable dispersion without a wide particle diameter distribution. This may be because an excessive increase in the hydrophilicity of the oil phase is suppressed.

A composite particle dispersion is obtained by mixing resins and a thermosetting agent and dispersing them in a dispersion medium (e.g., forming an emulsion, such as a phase-inversion emulsion).

The volume average particle diameter of resin particles dispersed in a resin particle dispersion is, for example, 1 μm or less, preferably 0.01 μm or more and 1 μm or less, more preferably 0.08 μm or more and 0.8 μm or less, and still more preferably 0.1 μm or more and 0.6 μm or less.

The volume average particle diameter of the resin particles is determined as follows: drawing the volume-based cumulative distribution from the smaller particle diameter side for divided particle size ranges (channels) by using the particle size distribution obtained by measurement with a laser diffraction-type particle size distribution analyzer (e.g., LA-700, Horiba Ltd.); and defining the particle diameter at 50% volume relative to the total particles as a volume average particle diameter D50v. The volume average particle diameter of the particles in other dispersions is measured similarly.

The amount of the resin particles contained in the resin particle dispersion is, for example, preferably 5% by mass or higher and 50% by mass or lower, and more preferably 10% by mass or higher and 40% by mass or lower.

The thermosetting agent dispersion and the colorant dispersion are prepared in the same manner as in the method for preparing the resin particle dispersion. In other words, the dispersion medium, the surfactant, the dispersion method, the volume average particle diameter of particles, and the amount of the particles for the thermosetting agent dispersion and the colorant dispersion are same as those for the resin particle dispersion.

First Aggregation Step

Next, the first resin particle dispersion, the thermosetting agent dispersion, and the colorant dispersion are mixed.

The first resin particles, the thermosetting agent dispersion, and the colorant undergo hetero-aggregation in the mixture dispersion to form first aggregated particles containing the first resin particles, the thermosetting agent, and the colorant and having a diameter close to the intended powder particle diameter.

Specifically, the first aggregated particles are formed, for example, as follows: adding a flocculant to the mixture dispersion and adjusting the pH of the mixture dispersion to the acid side (e.g., pH 2 or higher and pH 5 or lower), and as necessary, adding a dispersion stabilizer; and then heating the mixture dispersion to a temperature (specifically, for example, from a temperature 30° C. lower than the glass transition temperature of the first resin particles to the glass transition temperature of the first resin particles) close to the glass transition temperature of the first resin particles to cause aggregation of the particles dispersed in the mixture dispersion.

In the first aggregation step, the first aggregated particles may be formed by mixing the colorant dispersion and the composite particle dispersion containing a thermosetting resin and a thermosetting agent to cause hetero-aggregation of the composite particles and the colorant in the mixture dispersion.

The first aggregation step may involve, for example, adding a flocculant to the mixture dispersion at room temperature (e.g., 25° C.) under stirring with a rotary shear homogenizer and adjusting the pH of the mixture dispersion to the acid side (e.g., pH 2 or higher and pH 5 or lower), and heating the mixture dispersion after addition of a dispersion stabilizer as necessary.

Examples of the flocculant include surfactants having polarity opposite to the polarity of the surfactant contained in the mixture dispersion, metal salts, inorganic metal salt polymers, and metal complexes. The use of a metal complex as a flocculant reduces the amount of the surfactant used and improves charging characteristics.

A metal salt, an inorganic metal salt polymer, or a metal complex used as a flocculant is a metal ion source in the powder coating material. Examples of the metal salt, the inorganic metal salt polymer, and the metal complex include those described above.

Second Aggregation Step

Next, a first aggregated particle dispersion in which the obtained first aggregated particles are dispersed is mixed with the second resin particle dispersion. The second resin particles may be the same as or different from the first resin particles.

In the mixture dispersion in which the first aggregated particles and the second resin particles are dispersed, the second resin particles aggregate so as to be attached to the surfaces of the first aggregated particles, forming second aggregated particles in which the second resin particles are attached to the surfaces of the first aggregated particles.

Specifically, for example, in the first aggregation step, the second resin particle dispersion is added to the first aggregated particle dispersion when the first aggregated particles reach an intended particle diameter. In this case, the second resin particle dispersion may be added while the first aggregated particle dispersion is continuously heated in order to accelerate the aggregation of the second resin particles on the surfaces of the first aggregated particles. Next, the progress of aggregation is stopped by adjusting the pH of the dispersion after mixing to a pH in the range of, for example, 6.5 or higher and 10.0 or lower.

The ammonium ion concentration in the powder particles is adjusted by performing the pH adjustment through addition of ammonia.

Ammonia may be added as ammonia water.

The amount of ammonia added may be such that the ammonium ion concentration in the mixture dispersion is 0.0001% by mass or higher and 0.005% by mass or lower.

Accordingly, the second aggregated particles in which the second resin particles aggregate so as to be attached to the surfaces of the first aggregated particles are obtained.

To stop the progress of aggregation, a chelator or the like may be added. Examples of the chelator include oxycarboxylic acids, such as EDTA, tartaric acid, citric acid, and gluconic acid; and aminocarboxylic acids, such as iminodiacetic acid and nitrilotriacetic acid. The total amount of the chelator added may be 0.01% by mass or higher and 3.0% by mass or lower relative to the entire resin particles.

Fusion-Coalescence Step

Next, the second aggregated particle dispersion in which the second aggregated particles are dispersed is heated to, for example, a temperature equal to or higher than the glass transition temperature of the first and second resin particles (e.g., a temperature equal to or higher than the glass transition temperature of the first and second aggregated particles by 10 to 30° C.) to fuse and coalesce the second aggregated particles, forming powder particles.

In the fusion-coalescence step, a powder coating material that satisfies $0.0 \le (Xb/(Xc+Xo))/((Xrb/(Xrc+Xro)) \le 0.01$ is obtained by performing heating after the pH before heating is set to 8.0 or higher. The pH is preferably 8.5 or higher and more preferably 9.0 or higher.

The powder particles are obtained through the above steps.

The ammonium ion concentration in the powder particles is adjusted by adding ammonia to a solution containing the obtained powder particles.

Ammonia may be added as ammonia water.

The amount of ammonia added may be such that the ammonium ion concentration in the solution containing the powder particles is 0.0001% by mass or higher and 0.005% by mass or lower.

After completion of the fusion-coalescence step, the powder particles formed in the dispersion is subjected to a known washing step, a known solid-liquid separation step, and a known drying step to obtain dried powder particles. The washing step may involve sufficient displacement washing with ion exchange water in view of charging characteristics. The solid-liquid separation step may involve, for example, suction filtration or pressure filtration in view of productivity. The drying step may involve, for example, freeze drying, flush drying, fluidized-bed drying, or vibratory fluidized-bed drying in view of productivity.

The powder coating material according to the exemplary embodiment is produced by, for example, adding an external additive to the obtained dry powder particles and mixing them. Mixing may be performed with, for example, a V-blender, a Henschel mixer, or a Lodige mixer. In addition, coarse particles in the powder coating material may be removed with, for example, a vibratory screening machine, or a wind-power screening machine, as necessary.

EXAMPLES

The exemplary embodiments will be described below in more detail by way of Examples and Comparative Examples, but the exemplary embodiments are not limited to the following Examples. The units "part" and "%" are on a mass basis, unless otherwise specified.

Clear Powder Coating Material (PCA1) Made of Acrylic Resin Preparation of Thermosetting Acrylic Resin Particle Dispersion (A1)
  Styrene: 160 parts by mass
  Methyl methacrylate: 200 parts by mass
  n-Butyl acrylate: 140 parts by mass
  Acrylic acid: 12 parts by mass
  Glycidyl methacrylate: 100 parts by mass
  Dodecanethiol: 12 parts by mass A monomer solution A in which the above components are mixed and dissolved is prepared.

Meanwhile, 12 parts by mass of an anionic surfactant (Dowfax available from The Dow Chemical Company) is dissolved in 280 parts by mass of ion exchange water, and the monomer solution A is added to the resulting solution and dispersed and emulsified in a flask to provide a solution (monomer emulsion A).

Next, 1 part by mass of an anionic surfactant (Dowfax available from The Dow Chemical Company) is dissolved in 555 parts by mass of ion exchange water, and the resulting solution is placed in a flask for polymerization. The flask for polymerization is then tightly sealed, and a reflux condenser is fitted to the flask. While the solution is slowly stirred with nitrogen introduced, the flask for polymerization is heated to 75° C. in a water bath and maintained at this temperature.

In this state, a solution prepared by dissolving 9 parts by mass of ammonium persulfate in 43 parts by mass of ion exchange water is added dropwise into the flask for polymerization by means of a metering pump over 20 minutes, and then the monomer emulsion A is further added dropwise by means of a metering pump over 200 minutes. After completion of dropwise addition, the flask for polymerization is maintained at 75° C. for 3 hours with the solution stirred continuously and slowly to complete polymerization, whereby an anionic thermosetting acrylic resin particle dispersion (A1) having a solid content of 42% is obtained.

The thermosetting acrylic resin particles contained in the anionic thermosetting acrylic resin particle dispersion (A1) have a volume average particle diameter of 220 nm, a glass transition temperature of 55° C., and a weight average molecular weight of 24,000.

Preparation of Thermosetting Agent Dispersion (D1)
  Dodecanedioic acid: 50 parts by mass
  Benzoin: 1 part by mass
  Acrylic oligomer (Acronal 4F available from BASF SE): 1 part by mass
  Anionic surfactant (Dowfax available from The Dow Chemical Company): 5 parts by mass
  Ion exchange water: 200 parts by mass The above components are heated to 140° C. in a pressure vessel and dispersed by using a homogenizer (Ultra-Turrax T50 available from IKA Ltd.). The dispersion is then subjected to a dispersion treatment in a Manton-Gaulin high-pressure homogenizer (available from Gaulin Corporation), whereby a thermosetting agent dispersion (D1) (thermosetting agent concentration: 23%) that has an average particle diameter of 0.24 μm and in which the thermosetting agent and other additives are dispersed is prepared.

Preparation of Clear Powder Coating Material (PCA1)

Aggregation Step
  Thermosetting acrylic resin particle dispersion (A1): 200 parts by mass (resin: 84 parts by mass)
  Thermosetting agent dispersion (D1): 91 parts by mass (thermosetting agent: 21 parts by mass)
  10% Polyaluminum chloride: 1 part by mass The above components are mixed well in a round stainless steel flask by using a homogenizer (Ultra-Turrax T50 available from IKA Ltd.) to form a dispersion. While the dispersion in the flask is stirred, the dispersion is then heated to 48° C. in a heating oil bath and maintained at 48° C. for 60 minutes to grow aggregated particles to 8.8 μm. To the dispersion, 68 parts by mass of the thermosetting acrylic resin particle dispersion (A1) (28.56 parts by mass of resin), which is a shell component, is then added, and the resulting mixture is stirred gently.

Fusion Step

Thereafter, the pH in the flask is adjusted to 5.0 with 0.5 mol/L of sodium hydroxide aqueous solution, and the flask is then heated to 95° C. under continuous stirring. After the flask is heated to 95° C., this state is maintained for 4 hours. The pH when the temperature is maintained at 95° C. is about 4.0.

Filtering Washing Drying Step

After the reaction is complete, the solution in the flask is cooled and filtered to obtain a solid. Next, the solid is washed well with ion exchange water and then subjected to solid-liquid separation through Nutsche-type suction filtration to obtain a solid again.

Next, the obtained solid is redispersed in 3 L of ion exchange water at 40° C. and washed by stirring at 300 rpm for 15 minutes. This washing operation is repeated 5 times, and the solid obtained by solid-liquid separation through Nutsche-type suction filtration is vacuum-dried for 12 hours.

Thereafter, 0.5 parts by mass of hydrophobic silica particles (volume average particle diameter 8 nm) are added as an external additive to 100 parts by mass of the powder particles in the solid to provide a clear powder coating material (PCA1) made of acrylic resin.

The clear powder coating material has a volume average particle diameter D50v of 10.6 μm, a volume average particle size distribution index GSDv of 1.21, and an average circularity Ca of 0.97.

The clear powder coating material is embedded in epoxy resin and then cut. As the cross-sectional image of the particles is observed under a transmission electron microscope, it is confirmed that the surfaces of the powder particles are covered with the coating resin.

Hydrophobic silica particles (0.51 parts) having a volume average particle diameter of 8 nm are externally added to 100 parts of the powder particles after drying to provide a powder coating material.

Commercially Available Ground and Classified Clear Powder Coating Material (PCA2) Made of Polyester Resin A commercially available polyester powder coating material (trade name "783-900 Clear Powder Particles" available from Kuboko Paint Co., Ltd.) produced by a kneading/grinding method is ground in Turbo Mill model R T400-4RS110 (available from Freund-turbo corporation) at a rotation speed of 2500 $\text{min}^{-1}$, and the medium-diameter particles are classified in Elbow-Jet LABO (available from Nittetsu Mining Co., Ltd.) to provide powder particles having a volume average particle diameter of 11.5 μm, a GSDv of 1.37, and an average circularity Ca of 0.93.

Hydrophobic silica particles (0.61 parts) having a volume average particle diameter of 8 nm are externally added to 100 parts of the obtained powder particles to provide a clear powder coating material (PCA2).

Clear Powder Coating Material (PCA3) Made of Acrylic Resin

Powder particles having a volume average particle diameter of 6.1 μm, a GSDv of 1.24, and an average circularity Ca of 0.99 are prepared by growing the aggregated particles to 5 μm, adding the shell component, performing coalescence and fusion, and then filtering and drying the resulting particles by the same methods as those for the powder coating material (PCA1).

Hydrophobic silica particles (0.61 parts) having a volume average particle diameter of 8 nm are externally added to 100 parts of the obtained powder particles to provide a clear powder coating material (PCA3).

Example: Commercially Available Ground and Classified Clear Powder Coating Material (PCA4) Made of Polyester Resin Powder particles having a volume average particle diameter of 18.9 μm, a GSDv of 1.20, and an average circularity Ca of 0.90 are prepared by the same operation as that for the powder coating material (PCA2) except that further grinding is performed in Turbo Mill at a number of rotation of 1800 $\text{min}^{-1}$.

Hydrophobic silica particles (0.70 parts) having a volume average particle diameter of 8 nm are externally added to 100 parts of the obtained powder particles to provide a clear powder coating material (PCA4).

Various Properties of Powder Coating Material

Various properties of the powder coating material are examined according to the methods described above. The results are shown in Tables.

Median diameter D50v

Volume particle size distribution index GSDv

Average circularity Ca

Aerated flowability energy AE

Floating ratio

The volume average particle diameter (referred to simply as "particle diameter" in Tables) of the external additive is also shown in Tables.

Tests A to D

Formation of Coating Film by Fluidized-Bed Coating

A fluidized-bed vessel including, at its bottom, a metal jig in which the disk-shaped upper surface is a 2,300 mesh (mesh size 5 μm) stainless steel surface from which air is introduced and, at its side, a glass tube (thickness 3 mm) having an inner diameter of ø 50 mm (cross-sectional area: about 2,000 $mm^2$) is provided.

Next, a powder coating material having a volume of 80 mL is placed in the fluidized-bed vessel.

Next, air is introduced from the bottom of the fluidized-bed vessel so that the floating ratio of the powder coating material at the corresponding average air flow rate is as shown in Table 1, whereby the powder coating material is brought into a fluidized state. At this time, a 100-Hz vibration is applied to the fluidized-bed vessel.

Next, an aluminum substrate (aluminum base material 35 mm in width×75 mm in length×3 mm in thickness) heated on the electric griddle is immersed. Specifically, in Examples, the aluminum substrate is immersed in the powder coating material after the aluminum substrate is heated at the preheating temperature described in Table 1 such that the surface temperature of the aluminum substrate falls in the range of "the softening temperature or higher and the melting temperature or lower" during the immersion in the powder coating material. In Comparative Examples, the aluminum substrate is immersed in the powder coating material after the aluminum substrate is heated at the preheating temperature described in Table 1 such that the surface temperature of the aluminum substrate falls out of the range of "the softening temperature or higher and the melting temperature or lower" during the immersion in the powder coating material.

The aluminum base material is slowly moved along an arc at 10 to 20 mm/sec during the immersion in the powder coating material.

Next, after 10 seconds of immersion, the aluminum base material is taken out of the powder coating material.

The film of the powder coating material attached to the aluminum base material is then heated at 180° C. for 30 minutes and baked to form a coating film.

The coating film is evaluated on the basis of the following evaluation criteria. The results are shown in Tables.

A: The coating film is a continuous and smooth thin film having a film thickness of 20 μm or more and 50 μm or less.

B: The coating film is a continuous film having a film thickness of 10 μm or more and 50 μm or less although it has some unevenness.

C: The coating film is a discontinuous film from which the base layer is exposed.

D: The coating film is hardly formed.

E: The coating film is a continuous film having a film thickness of 100 μm or more.

TABLE 1

| | | | | | | | | | | Powder Coating Material | | | | |
| --- | --- | --- | --- | --- | --- | --- | --- | --- | --- | --- | --- | --- | --- | --- |
| | | | | | | | | | | | Particle | Coating Conditions | | |
| | | Type | D50v μm | DSDv | Ca | AE mJ | Floating Ratio % | Tg °C. | Tm °C. | Diameter of External Additive nm | Average Air Flow Rate mm/min | Floating Ratio % | Preheating Temperature °C. | Evaluation Formation of Coating Film | Note |
| Test A | 1 | PCA1 | 10.6 | 1.21 | 0.97 | 20.7 | 15 | 56 | 115 | 8 | 4 | 3 | 100 | C | Comparative Example |
| | 2 | | | | | | | | | | 5 | 5 | 100 | A | Example |
| | 3 | | | | | | | | | | 10 | 15 | 100 | A | Example |
| | 4 | | | | | | | | | | 20 | 20 | 100 | A | Example |
| | 5 | | | | | | | | | | 30 | 30 | 100 | C | Comparative Example |
| | 6 | | | | | | | | | | 10 | 15 | 75 | D | Comparative Example |
| | 7 | | | | | | | | | | 10 | 15 | 80 | A | Example |
| | 8 | | | | | | | | | | 10 | 15 | 120 | A | Example |
| | 9 | | | | | | | | | | 10 | 15 | 125 | C | Comparative Example |
| | 10 | | | | | | | | | | 10 | 15 | 150 | E | Comparative Example |
| Test B | 1 | PCA2 | 11.5 | 1.37 | 0.93 | 20.1 | 16 | 54 | 105 | 8 | 4 | 4 | 100 | C | Comparative Example |
| | 2 | | | | | | | | | | 5 | 7 | 100 | A | Example |
| | 3 | | | | | | | | | | 10 | 16 | 100 | A | Example |
| | 4 | | | | | | | | | | 18 | 20 | 100 | A | Example |
| | 5 | | | | | | | | | | 20 | 24 | 100 | C | Comparative Example |
| | 6 | | | | | | | | | | 10 | 16 | 70 | D | Comparative Example |
| | 7 | | | | | | | | | | 10 | 16 | 75 | A | Example |
| | 8 | | | | | | | | | | 10 | 16 | 110 | A | Example |
| | 9 | | | | | | | | | | 10 | 16 | 115 | C | Comparative Example |
| | 10 | | | | | | | | | | 10 | 16 | 150 | E | Comparative Example |

TABLE 2

| | | | | | | | | | | Powder Coating Material | | | | |
| --- | --- | --- | --- | --- | --- | --- | --- | --- | --- | --- | --- | --- | --- | --- |
| | | | | | | | | | | | Particle | Coating Conditions | | |
| | | Type | D50v μm | DSDv | Ca | AE mJ | Floating Ratio % | Tg °C. | Tm °C. | Diameter of External Additive nm | Average Air Flow Rate mm/min | Floating Ratio % | Preheating Temperature °C. | Evaluation Formation of Coating Film | Note |
| Test C | 1 | PCA3 | 6.1 | 1.24 | 10.99 | 7.3 | 18 | 56 | 115 | 8 | 4 | 6 | 100 | C | Comparative Example |
| | 2 | | | | | | | | | | 5 | 6 | 100 | A | Example |
| | 3 | | | | | | | | | | 10 | 18 | 100 | A | Example |
| | 4 | | | | | | | | | | 20 | 25 | 100 | C | Example |
| | 5 | | | | | | | | | | 30 | 40 | 100 | C | Comparative Example |
| | 6 | | | | | | | | | | 10 | 18 | 75 | D | Comparative Example |
| | 7 | | | | | | | | | | 10 | 18 | 80 | A | Example |
| | 8 | | | | | | | | | | 10 | 18 | 120 | B | Example |
| | 9 | | | | | | | | | | 10 | 18 | 125 | C | Comparative Example |

TABLE 2-continued

| | | Powder Coating Material | | | | | | | Particle | Coating Conditions | | | | |
|---|---|---|---|---|---|---|---|---|---|---|---|---|---|---|
| | Type | D50v μm | DSDv | Ca | AE mJ | Floating Ratio % | Tg °C. | Tm °C. | Diameter of External Additive nm | Average Air Flow Rate mm/min | Floating Ratio % | Preheating Temperature °C. | Evaluation Formation of Coating Film | Note |
| 10 | | | | | | | | | | 10 | 18 | 150 | E | Comparative Example |
| Test D 1 | PCA4 | 18.9 | 1.2 | 0.9 | 48.3 | 10 | 54 | 105 | 8 | 4 | 4 | 100 | C | Comparative Example |
| 2 | | | | | | | | | | 5 | 7 | 100 | A | Example |
| 3 | | | | | | | | | | 10 | 10 | 100 | A | Example |
| 4 | | | | | | | | | | 20 | 18 | 100 | A | Example |
| 5 | | | | | | | | | | 30 | 22 | 100 | C | Comparative Example |
| 6 | | | | | | | | | | 10 | 10 | 70 | D | Comparative Example |
| 7 | | | | | | | | | | 10 | 10 | 75 | A | Example |
| 8 | | | | | | | | | | 10 | 10 | 110 | A | Example |
| 9 | | | | | | | | | | 10 | 10 | 115 | C | Comparative Example |
| 10 | | | | | | | | | | 10 | 10 | 150 | E | Comparative Example |

The above results indicate that the fluidized-bed coating methods according to Examples can form a continuous thin coating film having a film thickness of 10 μm or more and 50 μm or less compared with the fluidized-bed coating methods according to Comparative Examples.

Since the fluidized-bed coating methods according to Examples can successfully form a continuous thin coating film, it is supposed that the surface temperature of the workpiece is maintained at an appropriate temperature for a length of time needed to form a coating film from the start of immersion.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A fluidized-bed coating method comprising:
   immersing at least part of a workpiece in a powder coating material contained in a fluidized-bed vessel while air is introduced from a bottom of the fluidized-bed vessel at an average air flow rate of 5 mm/min or higher and 20 mm/min or lower per unit area of the bottom so that a floating ratio of the powder coating material is 5% or higher and 20% or lower;
   taking the workpiece out of the powder coating material; and
   heating the powder coating material attached to the workpiece,
   wherein when the at least part of the workpiece is immersed in the powder coating material, a surface temperature of an immersed portion of the workpiece decreases by at least 5° C. from a preheating temperature due to conveyance before the immersion and heat conduction to contact particles of the powder coating material during the immersion, and is then maintained in a range of from a softening temperature of the powder coating material to a melting temperature of the powder coating material for at least 5 seconds after the immersion,
   wherein the softening temperature of the powder coating material is a glass transition temperature of the powder coating material and is in a range of 45° C. to 70° C., and the melting temperature of the powder coating material is in a range of 80° C. to 180° C.,
   wherein the powder coating material has a volume average particle diameter D50v of 5 μm or more and 20 μm or less,
   wherein the workpiece is preheated to the preheating temperature before the conveyance and the immersion, and the preheating temperature is set in a range of from a temperature 20° C. higher than the softening temperature of the powder coating material to a temperature 5° C. higher than the melting temperature of the powder coating material.

2. The fluidized-bed coating method according to claim 1, wherein an immersion time for the at least part of the workpiece is 5 seconds or longer and 10 seconds or shorter.

3. The fluidized-bed coating method according to claim 1, wherein the powder coating material has an aerated flowability energy AE of 5 mJ or higher and lower than 100 mJ, where the AE is measured with a powder rheometer using a vessel having a cross-sectional area with Ø 50 mm under conditions of a rotary blade tip speed of 100 mm/sec, a rotary blade helix angle of −5°, and an air flow rate of 20 ml/min.

4. The fluidized-bed coating method according to claim 1, wherein the powder coating material has a volume particle size distribution index GSDv of 1.15 or higher and 1.40 or lower.

5. The fluidized-bed coating method according to claim 4, wherein the powder coating material has a volume particle size distribution index GSDv of 1.15 or higher and 1.25 or lower.

6. The fluidized-bed coating method according to claim 1, wherein the floating ratio is 10% or higher and 20% or lower.

7. The fluidized-bed coating method according to claim 1, wherein the powder coating material includes powder particles and an external additive on the powder particles.

8. The fluidized-bed coating method according to claim 7, wherein the external additive is a hydrophobic external additive.

9. The fluidized-bed coating method according to claim 7, wherein the external additive has a volume average particle diameter of 5 nm or more and 30 rim or less.

* * * * *